United States Patent
Gronowski

(10) Patent No.: US 11,836,131 B1
(45) Date of Patent: Dec. 5, 2023

(54) SYSTEMS AND METHODS FOR UPDATING ELECTRIC CHARGER LOCATIONS

(71) Applicant: Rivian IP Holdings, LLC, Irvine, CA (US)

(72) Inventor: Kristoffer Gronowski, Monte Sereno, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/844,966

(22) Filed: Jun. 21, 2022

(51) Int. Cl.
*G06F 16/23* (2019.01)
*G06F 16/29* (2019.01)
*B60L 53/18* (2019.01)
*B60L 53/66* (2019.01)

(52) U.S. Cl.
CPC .......... *G06F 16/2379* (2019.01); *B60L 53/18* (2019.02); *B60L 53/66* (2019.02); *G06F 16/29* (2019.01)

(58) Field of Classification Search
CPC ...... G06F 16/2379; G06F 16/29; B60L 53/66; B60L 53/18
USPC ......................................................... 701/109
See application file for complete search history.

(56) References Cited

FOREIGN PATENT DOCUMENTS

| CN | 103155343 A | * | 6/2013 | ............. B60L 50/16 |
| CN | 109562694 A | * | 4/2019 | ............. B60L 5/005 |

OTHER PUBLICATIONS

CN103155343A (Uyeki,R) (Jun. 12, 2013) (Machine Translation) (Year: 2013).*

* cited by examiner

*Primary Examiner* — Mahmoud Gimie
(74) *Attorney, Agent, or Firm* — Haley Guiliano LLP

(57) ABSTRACT

Systems and methods are provided to update a location stored at a server for an electric charger. A determination is made that an electric vehicle is being charged at an electric charger, and a location of the electric charger may be retrieved from a server storing a plurality of locations of electric chargers. A determination of a location of the electric charger may be made based on a positioning system of the electric vehicle. The location of the electric charger retrieved from the server may be compared to the location of the electric charger determined based on the positioning system of the electric vehicle. Based on the comparison, the location stored at the server for the electric charger, the location stored at a server for an electric charger may be updated.

20 Claims, 9 Drawing Sheets

SYSTEMS AND METHODS FOR UPDATING ELECTRIC CHARGER LOCATIONS

INTRODUCTION

Many electric vehicles include a battery which must be charged periodically via an electric charger to enable the battery to power the electric vehicle. Many commercial charger locations have been geotagged to help drivers identify a suitable electric charging station in his or her area. However, charger locations are often wrongly geotagged, e.g., by a network provider, or the charger was installed at a slightly different location than the geotag, etc., which may cause locating an electric charger location to be a frustrating and time consuming experience for a user.

SUMMARY

Accordingly, systems and methods are disclosed herein comprising processing circuitry configured to determine that an electric vehicle is being charged at an electric charger and retrieve, from a server storing a plurality of locations of electric chargers, a location of the electric charger. The processing circuitry may determine, based on a positioning system of the electric vehicle, a location of the electric charger, and compare the location of the electric charger retrieved from the server to the location of the electric charger determined based on the positioning system of the electric vehicle. Based on the comparison, the processing circuitry may update the location stored at the server for the electric charger.

In some embodiments, updating, based on the comparison, the location stored at the server for the electric charger comprises determining, based on the comparison, that a difference between the location of the electric charger retrieved from the server and the location of the electric charger determined based on the positioning system of the electric vehicle exceeds a threshold; and updating the location stored at the server for the electric charger to be the location of the electric charger determined based on the positioning system of the electric vehicle.

In some embodiments, updating, based on the comparison, the location stored at the server for the electric charger comprises determining, based on the comparison, that a difference between the location of the electric charger retrieved from the server and the location of the electric charger determined based on the positioning system of the electric vehicle is below a threshold; determining an intermediate location that is in between the location of the electric charger retrieved from the server and the location of the electric charger determined based on the positioning system of the electric vehicle; and updating the location stored at the server for the electric charger to be the intermediate location.

In some embodiments, the processing circuitry may be further configured to receive positioning system data from a plurality of electric vehicles determined to be using the electric charger over a period of time; determine, based on the positioning system data, whether there is a discrepancy between the location of the electric charger stored at the server and locations indicated by the positioning system data; and update the location stored at the server for the electric charger in response to determining that the positioning system data indicates that a threshold number of electric vehicles are associated with the discrepancy over the period of time.

In some embodiments, updating, based on the comparison, the location stored at the server for the electric charger comprises determining, based on the comparison, that a difference between the location of the electric charger retrieved from the server and the location of the electric charger determined based on the positioning system of the electric vehicle exceeds a threshold; determining a location indicated by a positioning system of a user device associated with the electric vehicle; comparing the location indicated by the positioning system of the user device to at least one of the location of the electric charger retrieved from the server and the location of the electric charger determined based on the positioning system of the electric vehicle; and updating the location stored at the server for the electric charger further based on the comparing of the location indicated by the positioning system of the user device to at least one of the location of the electric charger retrieved from the server and the location of the electric charger determined based on the positioning system of the electric vehicle.

In some embodiments, wherein updating, based on the comparison, the location stored at the server for the electric charger comprises determining, based on the comparison, that a difference between the location of the electric charger retrieved from the server and the location of the electric charger determined based on the positioning system of the electric vehicle exceeds a threshold; determining a distance between the electric vehicle and the electric charger based on short-range communication between the electric vehicle and the electric charger; and updating the location stored at the server for the electric charger further based on the determined distance.

In some embodiments, determining that the electric vehicle is being charged at the electric charger comprises receiving an indication that the electric vehicle is in park, and receiving an indication that a new charging session has started.

In some embodiments, the processing circuitry may determine a length of an electric charging cable of the electric charger, and determine whether to update the location stored at the server for the electric charger based at least in part on the determined length of the electric charging cable.

In some embodiments, a non-transitory computer-readable medium may be provided, having non-transitory computer-readable instructions encoded thereon that, when executed by a processor, causes the processor to determine that an electric vehicle is being charged at an electric charger; retrieve, from a server storing a plurality of locations of electric chargers, a location of the electric charger; determine, based on a positioning system of the electric vehicle, a location of the electric charger; compare the location of the electric charger retrieved from the server to the location of the electric charger determined based on the positioning system of the electric vehicle; and update, based on the comparison, the location stored at the server for the electric charger.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
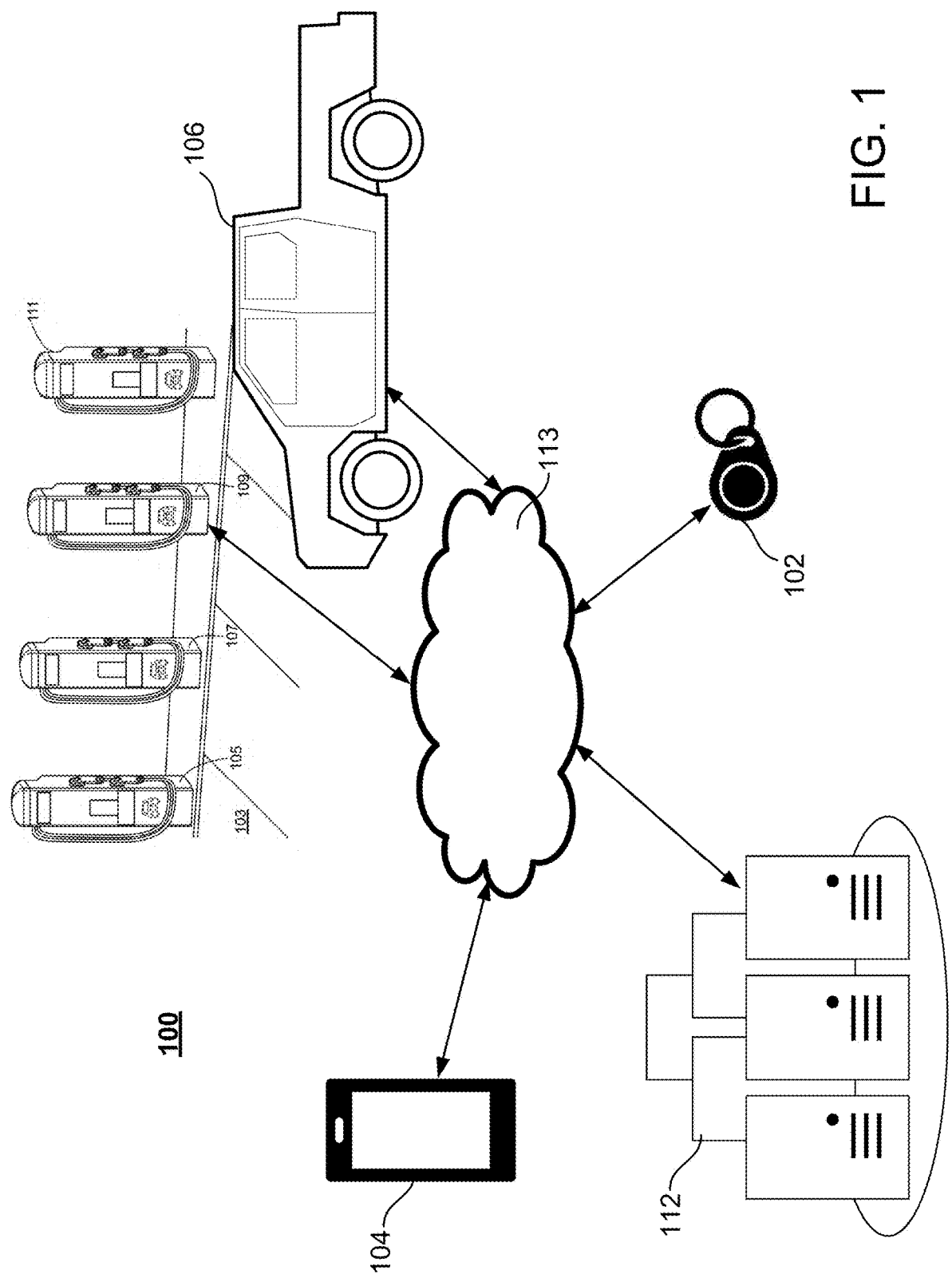
FIG. 1 shows a block diagram of components of a system configured to update a location for an electric charger stored at a server, in accordance with some embodiments of the present disclosure.

FIG. 1 shows a block diagram of components of a system 100 configured to update a location for an electric charger stored at a server, in accordance with some embodiments of the present disclosure. System 100 may comprise any suitable number of vehicles and any suitable number of electric chargers located at any number of geographical locations. For example, system 100 may include vehicle 106 and chargers 105, 107, 109, 111, which each may be located at electric charging station 103. Each electric charger may correspond to one or more towers having one or more charging cords emanating therefrom, and the charging chords may comprise plugs used to establish an electrical connection between one of the electric chargers 105, 107, 109, 111 and vehicle 106 in order to charge a battery of vehicle 106, which may be an electric vehicle or hybrid vehicle. In some embodiments, system 100 may be configured to charge vehicle 106 wirelessly, e.g., via an inductive charging technique, such as by way of aligning inductive plates or inductive pads positioned in each of electric charger 111 (e.g., a transmission plate) and vehicle 106 (e.g., a receiver plate configured to receive power), rather than physically plugging in a plug to vehicle 106. Such wireless charging technique may be implemented in accordance with a standard, e.g., SAE J2954. In some embodiments, electric charging station 103 may correspond to a particular address or location, such as, for example, a parking lot or other designated area having one or more electric chargers available for use. System 100 may comprise one or more user devices (e.g., a key fob 102; a mobile device 104, such as, for example, a smart phone or a tablet; or any other suitable computing device, such as, for example a laptop computer, a desktop computer; or any combination thereof) and cloud computing resources 112 (e.g., one or more remote servers, which may include and/or maintain and/or be in communication with one or more databases).

The elements of system 100 may be configured to communicate over any suitable wireless or wired communication path. For example, user devices 102 and 104 may be configured to communicate with vehicle 106 and one or more of charger 105, 107, 109, 111 using a short-range radio communication technique, such as, for example, Bluetooth low energy (BLE), ultra-wideband techniques, or near-field communication (NFC) and/or any other suitable techniques. Additionally or alternatively, user devices 102 and 104 may be configured to communicate with vehicle 106 and one or more of charger 105, 107, 109, 111 over network 113, e.g., the Internet, a local area network, a wide area network, a satellite network, a cellular network, etc., and/or any other suitable technique. In some embodiments, vehicle 106 may be configured to communicate with one or more of charger 105, 107, 109, 111 using a short-range communication technique and/or over network 113, and vehicle 106 may be configured to communicate with cloud computing resources 112 over network 113.

In some embodiments, cloud computing resources 112 may store and maintain one or more databases comprising indications of a plurality of electric charging stations and/or a plurality of electric chargers and corresponding geographic locations of the respective electric charging stations and/or respective electric chargers. For example, cloud computing resources 112 may store geographical coordinates, e.g., latitude and longitude, or street addresses, or nearby landmarks, or any other suitable indicator of the location of a particular electric charger and/or characteristics of a particular electric charging station. For example, cloud computing resources 112 may store an indication for each electric charging station or electric charger or an accuracy associated with a Global Positioning System (GPS) system and/or other system or technique which may have been used to obtain the latitude and longitude coordinates of such electric charging station or electric charger. In some embodiments, such one or more databases may be associated with a manufacturer or distributor of vehicle 106 and/or a manufacturer or distributor of at least one of electric chargers 105, 107, 109, 111, and one or more of such entities may provide location information regarding the electric chargers and/or electric charging stations to the database, or any other suitable technique may be employed to determine a location of the electric chargers and/or electric charging stations, e.g., based on images or measurements gathered by satellites or other vehicles regarding the locations of the electric chargers and/or electric charging stations, and/or based on annotations with human inspection, etc.

In some embodiments, such location information of the electric chargers stored in the one or more databases may be used by the vehicle or electric charger manufacturer, and/or an affiliate thereof, to provide a website and/or mapping application, accessible by users (e.g., via user device 102 or 104 and/or vehicle 106 associated with the vehicle manufacturer) to locate and navigate to the electric chargers indicated in the database. In some embodiments, such location information of the electric chargers stored in the one or more databases may be provided to a third party service, which in turn may utilize such information to provide a website or mapping application, accessible by users to locate and navigate to the electric chargers indicated in the database. In some embodiments, even in a particular vehicle is not associated with the vehicle manufacturer which may operate the above-mentioned website and/or application, a user located in such vehicle may be running the website or application on his or her user device, e.g., a smartphone. In some embodiments, such application may access a GPS of the particular vehicle that may not be affiliated with the vehicle manufacturer associated with the application using any suitable technique, e.g., though the Android Hardware Access Layer (HAL), and thus cloud computing resources or server 112 may be provided with GPS information from such unaffiliated vehicle.

In some embodiments, server 112 may be configured to compare a location of an electric charger received from, e.g., vehicle 106 and/or user device 102 and/or user device 104, to a location for electric charger 105, 107, 109, 111 stored at server 112. In some embodiments, server 112 may update the location for such electric charger based on the comparison. In some embodiments, server 112 may enable a user to log into a user account at vehicle 106, and in response to logging to the user account, retrieve (e.g., by server 112 or vehicle 106) the user profile associated with the user account, and cause the user profile to be loaded at vehicle 106. In some embodiments, vehicle 106 may be configured to communicate to server 112 user preference information, user information, vehicle settings, and/or vehicle information, or any other suitable information, or any combination thereof.

User device 102 and/or 104 may be operable by a user to perform various functions in connection with vehicle 106 (e.g., remote start, unlocking and locking doors or hatches, pairing to a media system of vehicle 106, starting or turning on vehicle 106, signaling a panic condition, or any other suitable functions or any combination thereof) over wireless or wired communication paths. In some embodiments, user device 102 or 104 may be used to log into a user account or profile at vehicle 106. In some embodiments, user device 102 may be a key fob comprising a number of buttons (e.g., two, three, four, or more than four buttons or any other suitable number of buttons) that respectively correspond to a function or command. Such key fob may include a battery to provide electrical power, an antenna for transmitting and receiving signals, and processing circuitry to convert user selections (e.g., presses of a button) to an electrical signal which may then be converted to a wireless signal (e.g., via the antenna). In some embodiments, user device 102 or 104 may comprise a proximity sensor associated with, e.g., an RFID tag, or other positioning sensor, which may enable processing circuitry to ascertain a location of a vehicle occupant associated with user device 102 or 104.

Figure 2:
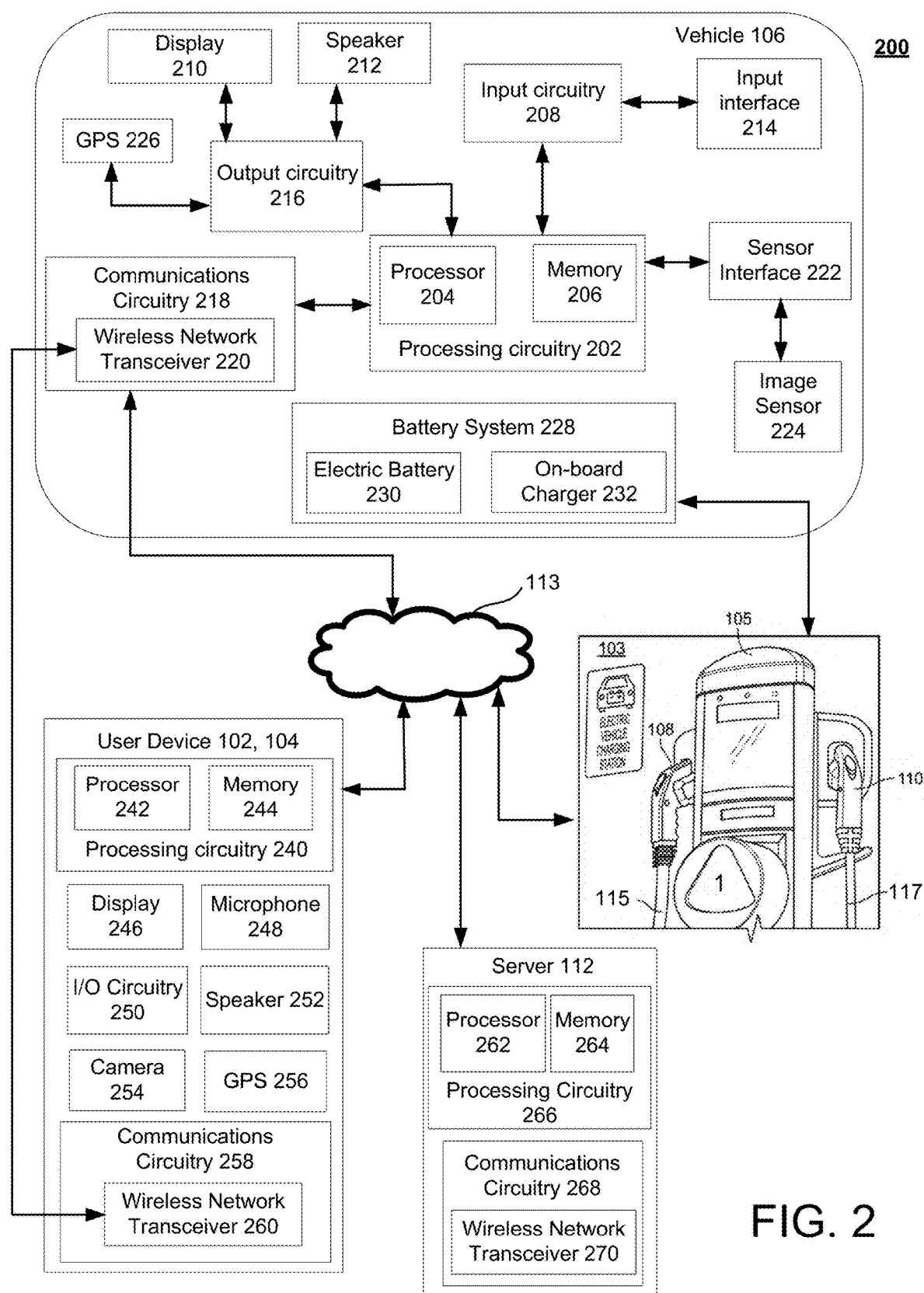
FIG. 2 shows a block diagram of components of a system configured to update a location for an electric charger stored at a server, in accordance with some embodiments of the present disclosure.

FIG. 2 shows a block diagram of components of a system 200 configured to update a location for an electric charger stored at a server, in accordance with some embodiments of the present disclosure. Vehicle 106 may be a car (e.g., a coupe, a sedan, a truck, a delivery vehicle, an SUV, a bus, or any other suitable type of car, or any combination thereof), a motorcycle, an aircraft (e.g., a drone, or any other suitable type of aircraft), a watercraft (e.g., a boat or any other suitable type of watercraft), or any other suitable type of vehicle which may be capable of being charged, or any combination thereof. In some embodiments, vehicle 106 may be configured to operate autonomously or semi-autonomously.

Vehicle 106 may comprise processing circuitry 202 which may comprise processor 204 and memory 206. Processor 204 may comprise a hardware processor, a software processor (e.g., a processor emulated using a virtual machine), or any combination thereof. In some embodiments, processor 204 and memory 206 in combination may be referred to as processing circuitry 202 of vehicle 106. In some embodiments, processor 204 alone may be referred to as processing circuitry 202 of vehicle 106. Processing circuitry 202 may be communicatively connected to components of vehicle 106 via one or more wires, or via wireless connection. In some embodiments, the processor 204 may include one or more processors such as, for example, a central processing unit having a single core or dual core, bus, logic circuitry, integrated circuitry, digital signal processor, graphics processor, an embedded processing device, any other suitable components for reading and executing computer instructions, or any combination thereof. Processing circuitry 202 may monitor sensor signals, generate control signals, execute computer readable instructions, receive inputs, perform any other suitable actions, or any combination thereof.

Memory 206 may comprise hardware elements for non-transitory storage of commands or instructions, that, when executed by processor 204, cause processor 204 to operate vehicle 106 in accordance with embodiments described above and below. Memory 206 may include any suitable storage device such as, for example, volatile memory, non-volatile memory, a removable storage device, a solid-state storage device, an optical device, a magnetic device, any other suitable component, or any combination thereof, for storing information.

Processing circuitry 202 may be communicatively connected to input interface 214 (e.g., a steering wheel, a touch screen display, buttons, knobs, a microphone or other audio capture device, or any other suitable input interface, or any combination thereof) via input circuitry 208. In some embodiments, a driver or occupant of vehicle 106 may be permitted to select options to display icons corresponding to one or more locations of electric chargers and input interface 214 may receive an instruction to navigate to a particular electric charger. Input interface 214 may be configured to receive certain settings in connection with the operation of vehicle 106 via input interface 214, and/or input interface 214 may be configured to receive selection (e.g., via haptic input or voice input or any other suitable input or any combination thereof) of an option to pair user device 102 or user device 104 with vehicle 106, e.g., to mirror an application running on user device 104 in vehicle 106.

Processing circuitry 202 may be communicatively connected to display 210 and speaker 212 by way of output circuitry 216. Display 210 may be located at a dashboard of vehicle 106 and/or at a heads-up display at a windshield of vehicle 106, or at any other suitable location, or any combination thereof. Display 210 may comprise an LCD display, an OLED display, an LED display, or any other suitable type of display, or any combination thereof. Display 210 may be configured to display GPS information, electric charger location information, and/or selectable identifiers associated with user profiles of a particular user account or user account associated with vehicle 106, or any other suitable content, or any combination thereof. Speaker 212 may be located at any suitable location within vehicle 106, e.g., at a dashboard of vehicle 106, on an interior portion of the vehicle door, in a cargo portion of vehicle 106, or any combination thereof, and may be configured to provide audio output to a driver (e.g., directions to an electric charger, or any other suitable audio output) and/or occupant of vehicle 106.

Processing circuitry 202 may be communicatively connected to communications circuitry 218. Communications circuitry 218 may comprise wireless network transceiver 220 which may comprise any suitable hardware and/or software operable to send and receive wireless signals between vehicle 106 and external devices such as, for example, network or user devices (e.g., user device 102, user device 104, server 112, a Wi-Fi access point and/or a satellite, or any other suitable device or any combination thereof). Wireless network transceiver 220 may include an antenna and other control circuitry (e.g., protocol converters, rate converters, signal converters), or any combination thereof. Wireless network transceiver 220 may comprise one or more components to facilitate communication over any suitable network or communication method (e.g., the Internet, short-range radio communication such as, for example, Bluetooth, BLE, NFC, etc.). For example, wireless network transceiver 220 may be configured to access the Internet, a local area network, a wide area network, a Bluetooth-enabled device, an NFC-enabled device, any other suitable device using any suitable protocol, or any combination thereof.

One or more image sensors 224 (e.g., a camera) may be communicatively coupled to processing circuitry 202 (e.g., by way of sensor interface 222) and may be positioned at any suitable position in an interior or exterior of vehicle 106, to capture images of an internal or external environment of vehicle 106. In some embodiments, image sensor 224 may capture images of electric charging stations 103 and/or electric chargers 105, 107, 109, 111 visited by vehicle 106 to identify favorite chargers or charging stations of an operator of vehicle 106, or a current charger or charging station that vehicle 106 is located at, or historical chargers or charging stations visited by vehicle 106. In some embodiments, vehicle 106 may comprise one or more sensors positioned at a variety of locations of vehicle 106. Such sensors may be one or more of any suitable type of sensor, e.g., an image sensor, an ultrasonic sensor, any suitable sensor for Advanced driver assistance systems (ADAS), a radar sensor, LED sensor, ultra-wideband sensor, LIDAR sensor, etc., configured to measure the distance between vehicle 106 and an object in a surrounding environment of the vehicle (e.g., an electric charger, by outputting a light or radio wave signal, and measuring a time or a return signal to be detected and/or an intensity of the returned signal, and/or performing image processing on images captured by the image sensor of the surrounding environment of vehicle 106). One or more of such sensors may be configured to provide sensor signals that function as a secondary factor to improve triangulation, along with GPS 226 of vehicle 106.

In some embodiments, processing circuitry 202 may be communicatively connected to a positioning system, e.g., GPS system 226 of vehicle 106, or any other suitable positioning system or any combination thereof. The driver or occupant may interact with the GPS system such as via input interface 214. GPS system 234 may be in communication with one or more satellites and/or one or more servers 112 to ascertain a location of vehicle 106 and provide navigation directions to processing circuitry 202 to a particular destination. As another example, the positioning system may operate on terrestrial signals, such as cell phone signals, Wi-Fi signals, or ultra-wideband signals, or any other suitable signals, or any combination thereof, to determine a location of electric vehicle 106. The determined location may be in any suitable form such as a geographic coordinate, a street address, a nearby landmark such as an identification of the nearest charging station or a tagged location associated with the vehicle (e.g., a location of a home of the user stored in memory 206, a location of a favorite electric charging station, etc.). In some embodiments, processing circuitry 202 may use the determined location to identify whether vehicle 106 is within a threshold range or confidence interval of a tagged location (e.g., is within a certain range from a charging station). In some embodiments, battery system 228 may utilize the determined location to identify whether charger 105 is a home charging station or a non-home charging station (e.g., a public charging station, another vehicle, a generator, etc.). In some embodiments, GPS information (e.g., a location of an electric charger) may be provided to display 210, e.g., via an in-vehicle application, and/or provided to display 246 of user device 102 or 104 via a mobile application.

Processing circuitry 202 may be communicatively connected to battery system 228, which may be configured to provide power to one or more components of vehicle 106 during operation. In some embodiments, vehicle 106 may be an electric vehicle or a hybrid electric vehicle. Battery system 228 may comprise electric battery 230, which may include one or more battery modules. In some embodiments, battery 230 may be a 180 kWh or 135 kWh battery pack, or any other suitable battery pack, or any combination thereof. Battery system 228 may comprise on-board charger 232 to manage the flow of electricity to electric battery 230 (e.g., to perform AC-DC conversion when charger 105 is an AC charger, or perform any other suitable tasks or any combination thereof), and any other suitable components. In some embodiments, on-board charger 232 may include connectors for interfacing with charger 105. Battery system 228 may be configured to manage charging of battery 230, which may include measuring one or more characteristics of battery 230, identifying if a fault has occurred, providing power to components of vehicle 106, communicating with charger 105, any other suitable actions, or any combination thereof.

Battery system 228 may include, for example, electrical components (e.g., switches, bus bars, resistors, capacitors or any other component or any combination thereof), control circuitry (e.g., for controlling suitable electrical components), and measurement equipment (e.g., to measure voltage, current, impedance, frequency, temperature, or another parameter or any combination thereof). Battery system 228 may provide charge status information to processing circuitry 202. Charge status information may include, for example, charge level, whether the battery is being charged, charging current, charging voltage, charging mode, or whether a charging fault exists, or any other suitable status, or any combination thereof. In some embodiments, charge status information may be provided to display 210, e.g., via an in-vehicle application, and/or provided to display 246 of user device 102 or 104 via a mobile application.

In some embodiments, electric vehicle 106 may be plugged, or otherwise connected to, charger 105 via a cable (e.g., having a SAE J1772 charging plug, a combined charging system (CCS) compatible connector, etc.), having more than one conductor of suitable gauge. Such cable 115, 117 may include conductors for carrying charging current and conductors for transmitting information. It will be understood that any suitable arrangement of leads may be used in accordance with the present disclosure. Charger 105 may correspond to, e.g., plug 108 and/or plug 110 of charger 105. Charger 105 may be coupled to a power source, e.g., a power transmission grid, a solar panel, a generator, a wind turbine, or another vehicle, or any other suitable power source or any combination thereof, and may be configured to provide charging current at a suitable charging voltage to battery 230 of electric vehicle 106. In some embodiments, charger 105 may correspond to a charger at charging station 103 which may be a DC station (e.g., DC fast electric charging station, such as, for example, a 26-100 kW DC Fast charging station or a 101-350 kW DC Fast charging station) or AC station (e.g., Level 1 or 20 Level 2). In some embodiments, system 100 may be configured to charge vehicle 106 wirelessly, e.g., via an inductive charging technique.

Charger 105 may be, for example, a fixed charging station (e.g., a charging station installed in a public location or in a user's home), or a portable charger (e.g., a charger connected to a portable generator, a portable solar panel, or another vehicle). In some embodiments, charger 105 may be capable of charging battery 230 at one or more voltages, with one or more current limitations. For example, charger 105 may receive information from battery system 228 indicating what voltage, current, or both, electric vehicle 106 may be charged with. Charger 105 may provide a charging current that is limited by one or more constraints. For example, electric vehicle 106 may communicate to charger 105 what charging current is desired for charging. In a further example, a cable type may have a maximum associated current capacity based on insulation and heat transfer considerations. In some embodiments, charger 105 and on-board charger 232, support both the inflow and outflow of current from battery 230 via a coupling. For example, during vehicle to vehicle charging or vehicle to grid power supply, charger 105 and/or on-board charger 232 may direct power from battery 230 to a power source coupled to charger 105, such as a battery of another vehicle or an electric power grid.

It should be appreciated that FIG. 2 only shows some of the components of vehicle 106, and it will be understood that vehicle 106 may also include other elements commonly found in vehicles (e.g., electric vehicles), e.g., a motor, brakes, wheels, wheel controls, turn signals, windows, doors, etc. It should be appreciated that, while FIG. 2 shows various components of different devices (e.g., processor, processing circuitry, memory, etc.) reference to such components can refer to one or more of such components, including combinations of components from different devices. For example, the term processor, as used herein, can refer to one or more processors, including combinations of processors from different devices, e.g., vehicle 106, user device 102 and/or 104, and server 112, and any other suitable device, or any combination thereof.

User device 102 (and user device 104) may comprise processing circuitry 240, processor 242, memory 244, which may be implemented in a similar manner as processing circuitry 202, processor 204 and memory 206 of vehicle 106, respectively. User device 102, 104 may further comprise display 246, microphone 248, input/output (I/O) circuitry 250, speaker 252, camera 254 and GPS 256, which may be implemented similarly to display 210, input interface 214 and output circuitry 216, speaker 212, image sensor 224 and GPS 226. Communications circuitry 258 may be implemented in a similar manner as communications circuitry 218 of vehicle 106. Communications circuitry 258 may comprise wireless network transceiver 260 which may comprise one or more components configured to receive and transmit signals using various communication techniques, to communicate with vehicle 106, electric charger 105, server 112, or any other suitable device, or any combination thereof.

Server 112 may comprise one or more of servers configured to remotely provide cloud computing resources (e.g., storage, processing, software applications, etc.) to other components of system 200. Server 112 may comprise processing circuitry 266 comprising processor 262 and memory 264, communications circuitry 268 and wireless network transceiver 270. Processing circuitry 266 may be implemented in a similar manner as processing circuitry 202, except processing circuitry 266 may be configured to utilize processors providing a greater amount of computing power, and server 112 may be configured to comprise storage and memory 264 with a greater amount of storage capacity. In some embodiments, server 112 may comprise a collection of servers, and processing circuitry 266 can be distributed across any suitable number of number of servers. In some embodiments, server 112 may provide information related to electric charging stations and/or electric chargers to vehicle 106.

Figure 3:
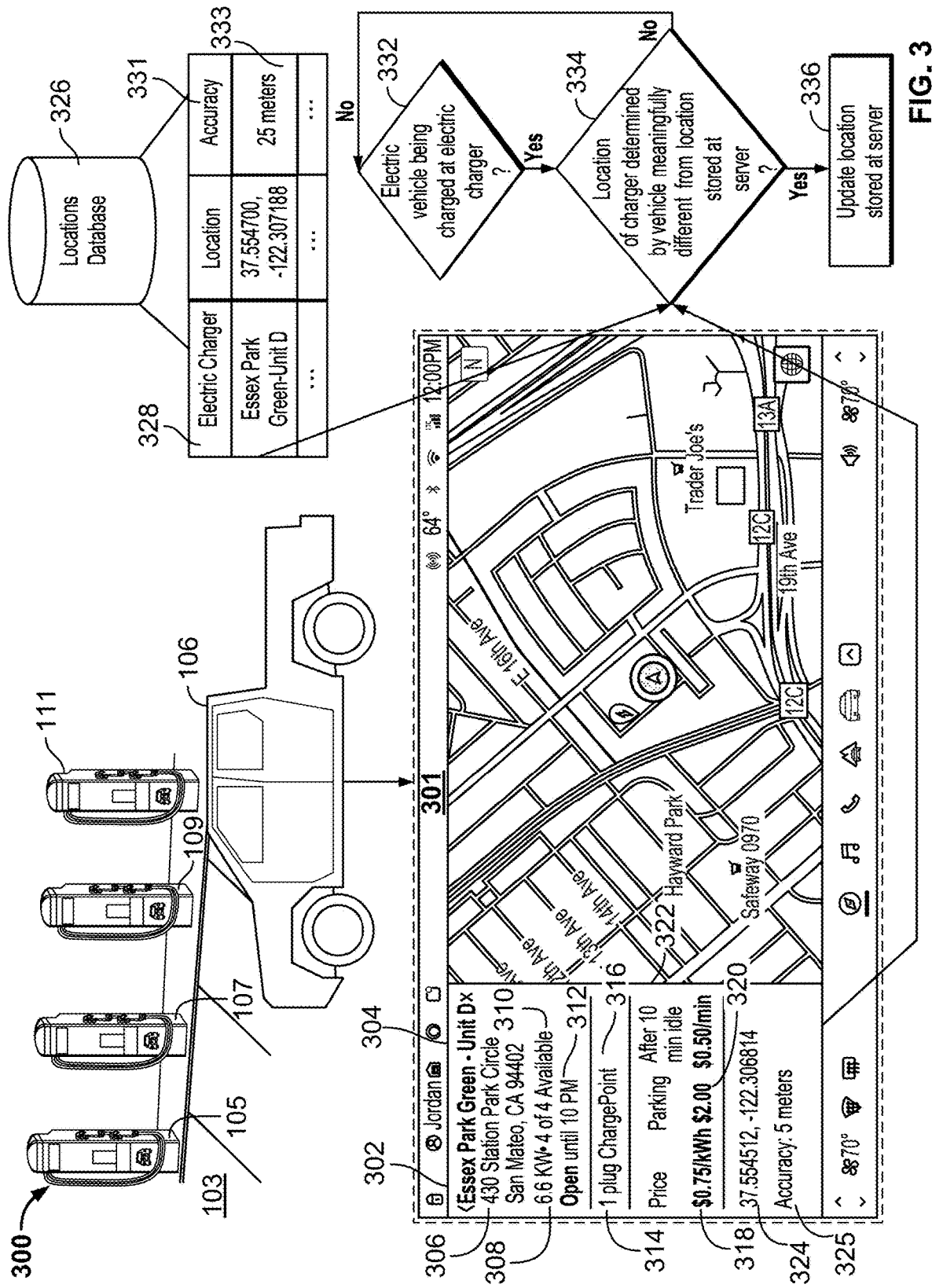
FIG. 3 shows a block diagram of components of a system configured to update a location for an electric charger stored at a server, in accordance with some embodiments of the present disclosure.

FIG. 3 shows a block diagram of components of a system configured to update a location for an electric charger stored at a server, in accordance with some embodiments of the present disclosure. As shown in FIG. 3, vehicle 106 may be located at electric charging station 103, and may be being charged via one of electric charger 105, 107, 109, or 111. In some embodiments, vehicle 106 may enable a user to view and interact with the in-vehicle application, e.g., via display 210 or any suitable in-vehicle infotainment system. For example, the in-vehicle application, and/or the mobile application accessible via user device 102 or 104, may be integrated with or be in communication with GPS 226 and/or server 112 or any other suitable computing device or any combination thereof, to provide interface 301 comprising information regarding charging station 103 and/or one or more of electric chargers 105, 107, 109, or 111. Such information may include parameters for electric charger 111 that vehicle 106 is being charged at, and/or parameters for charging station 103, such as, for example, a name 302 of electric charging station 103; a name 304 of electric charger 111; an address 306 of electric charging station 103 and/or electric charger 111; a power level 308 of charger 111; availability of plugs information 310 of charger 111; hours of operation 312 of charger 111; an indication 314 of a total number of plugs at charger 111; an indication 316 of a provider or manufacturer of charger 111; pricing information 318, 320, 322, and/or any other suitable information, and/or any combination thereof. In some embodiments, GPS 226 of vehicle 106 may determine a current location, e.g., indicated at 324 of interface 301, of vehicle 106, and may display a particular accuracy 325 associated with a positioning system (e.g., GPS 226) of vehicle 106 used to ascertain such current location. In some embodiments, a better accuracy at 325 may be associated with a higher confidence level with respect to location 324, where may be used to inform the determination of a threshold for comparison, as discussed below, and/or as part of a process of weighting the determination of the location indicated at 324.

The in-vehicle application and/or the mobile application may be integrated with or be in communication with GPS 226 and/or server 112 or any other suitable computing device or any combination thereof, to populate interface 301 with any suitable number and type of map objects and graphics, e.g., roads, driving routes, commercial establishments, government buildings, landmarks, electric charger locations, or any other suitable objects or any combination thereof. For example, interface 301 may be populated with one or more icons, e.g., icon 332 corresponding to charging station 103 and/or one or more of electric chargers 105, 107, 109, or 111, and icon 330 indicating a current location of vehicle 106. For example, the location of icon 332 on interface 301 may be determined based on information (e.g., geographical coordinates or other information) received from and stored at server 112, such as, for example, at locations database 326 or point of interests (POI) database, which may store indications of a particular electric charger (e.g., at column 328, "Essex Park Green—Unit D") and corresponding location (e.g., "37.554700, −122.307188" in column 331), and/or may store indications of a particular electric charger and corresponding locations. In some embodiments, database 326 may store a column or other representation 333 indicative of the accuracy of a particular positioning system which may have been used to ascertain each location indicated at column 331.

In some embodiments, interface 301 may receive input indicating a desired destination, e.g., charging station 103 and/or one or more of electric chargers 105, 107, 109, or 111. In some embodiments, interface 301 may provide a search bar selectable to display a keyboard for entering a search query. In some embodiments, navigation interface 301 may provide an icon representing a current status or charge of electric battery 230 of vehicle 106 based on information output by battery system 228. In some embodiments, interface 301 may display user-selectable icons for one or more categories (e.g., food, restrooms, vehicle charging, or any other suitable category or any combination thereof). In response to receiving user selection of one of the user-selectable icons, navigation interface 301 may present icons corresponding to identified locations of destinations corresponding to the selected category that are each selectable as the desired destination. For example, navigation interface 301 may display icons representing charging stations or chargers in an area around a current location of electric vehicle 106. In some embodiments, navigation interface 301 may display user-selectable icons for one or more recent destinations of the driver (or electric vehicle 106). In response to a user selection of one of user-selectable icons, navigation interface 301 may generate and display a navigation route to the selected destination.

At 332, processing circuitry 202 of vehicle 106 may determine whether vehicle 106 is being charged at an electric charger. For example, processing circuitry 202 may determine that vehicle 106 is plugged into (or has been wirelessly coupled to), and has just started a charging session with, an electric charger or a particular electric charger based on information output by battery system 228 or other component of vehicle 106 (e.g., telemetry data indicating vehicle 106 is in park or any other suitable information or any combination thereof); based on information received (wirelessly or over a wired connection) from electric charger 111 (e.g., location data, charger metadata, identifying information of the charger or charging station, or any other suitable data or combination thereof) or other computing devices (e.g., a remote server associated with charger 111); based on information received from user device 102 or 104; based on information received from server 112; or based on any other suitable factor, or any combination thereof. In some embodiments, the in-vehicle application or mobile application may prompt a user to confirm that vehicle 106 is currently in a charging state and/or to confirm a particular electric charger that vehicle 106 is being charged at.

Processing circuitry 202 of vehicle 106 may determine a current location, e.g., the location indicated at 324 of interface 301, of vehicle 106 determined to be in the charging state. For example, GPS 226 of vehicle 106 may ascertain a current location of vehicle 106 during charging. In some embodiments, processing circuitry 202 may determine that the location for vehicle 106 determined by GPS 226 is the latest GPS information for vehicle 106 if a state or gear of vehicle 106 is determined to be or determined to still be in park. As another example, processing circuitry 202 may determine that GPS data is fresh or up to date upon detecting that a timestamp of vehicle 106, a timestamp of the GPS data, and a timestamp of the determined current charging session is within a predefined threshold of each other, e.g., one minute, or any other suitable threshold.

At 334, processing circuitry 266 of server 112 (or processing circuitry 202 of vehicle 106, or any other suitable computing device) may determine whether the location of charger 111 determined by vehicle 106 is meaningfully different from the location of charger 111 stored at server 112. For example, processing circuitry 266 of server 112 may compare the location indicated at column 331 (e.g., "37.554700, −122.307188" in column 331) to the location indicated at 324 (e.g., "37.554512, −122.306814") determined by GPS 226 of vehicle 106. In some embodiments, such locations may be specified in the form of latitude and longitude coordinates, and a difference between such coordinates may be computed, e.g., in meters, or in any suitable distance or other measurement units, using any suitable technique (e.g., the Haversine formula or any other suitable technique). Processing circuitry 266 may determine that a difference between of the location indicated at column 331 and the location indicated at 324 is 39.04 meters, and this distance may be compared to a threshold distance (e.g., 25 meters, or any other suitable distance) to determine whether there is a meaningful difference between the two locations such that the location stored at database 326 should be updated. In this example, since 39.04 meters exceeds the threshold of 25 meters, processing may proceed to 336.

In some embodiments, the threshold may be selected based at least in part on an accuracy of GPS 226 (indicated at 325) and/or the accuracy (indicated at 333) of a positioning system used to determine the location indicated at 331. For example, if the accuracy indicated at 325 is 5 meters, the threshold may be set to 25 meters, or any other suitable distance; if the accuracy indicated at 325 is 1 meter, the threshold may be set to 15 meters, or any other suitable distance. In some embodiments, the threshold may be selected based at least in part on an accuracy indicated in column 333 for the particular location indicated at 331. For example, since the accuracy indicated at 325 of 5 meters is superior to the accuracy indicated at 333 of 25 meters, the accuracy indicated at 325 may be weighted more than the accuracy indicated at 333 with respect to determining the threshold value.

Additionally or alternatively, the threshold may be selected based at least in part on a cable length of cable 115 emanating from electric charger 111, and/or a location of a charging port on vehicle 106. For example, database 326 may store, for each respective electric charger, an indication of a cable length of a charging cable for the electric charger, and/or store an indication of a cable length of each charging cable at a particular charging station. Additionally or alternatively, vehicle 106 or server 112 may store an indication of a maximum charging cable length for commercial charging cables at public charging stations. As an example, if charging cable for charger 111 is determined to no longer than 15 feet (e.g., about 5 meters) or is determined to be 15 feet, processing circuitry 202 may increase the threshold distance to account for the cable length, since it is possible vehicle 106 is 15 feet from charger 111 and still being charged via the 15 foot cable. In some embodiments, if the accuracy is 5 meters and the cable length is 5 meters, the threshold may be set to at least 10 meters. In some embodiments, upon determining that vehicle 106 is being wirelessly charged, processing circuitry 202 may ascertain the location of, e.g., an inductive plate of vehicle 106 relative to an inductive plate of the electric charger, where such wireless charging may require a high proximity between plates. In such an instance, a cable may not be needed for the wireless charging, and thus in the wireless charging scenario cable length may not be factored in to determining a suitable threshold, as vehicle 106 may be assumed to be highly proximate charger 111.

In some embodiments, processing circuitry 266 may store or receive information indicating a location of a charging port on vehicle 106. Such information may be used, e.g., to help determine a particular electric charger at an electric charger station vehicle 106 is using. For example, if vehicle 106 is determined to be near a first charger and a second charger, but only the first charger is determined to be on the side of vehicle 106 matching the side of charging port of vehicle 106, such first charger may be determined to be more likely to be associated with the charging session with vehicle 106. In some embodiments, storing a location of a charging port may be beneficial to enable service personnel to more easily identify its location when performing maintenance, such as by referencing the stored location in server 112.

At 336, processing circuitry 266 of server 112 may update or correct the location stored in column 331 of database 326 for the charger "Essex Park Green—Unit D" to correspond to the location indicated at 324 and determined by the positioning system of vehicle 106. In some embodiments, if the comparison at 334 is performed at vehicle 106, vehicle 106 may transmit the comparison result to server 112 if the comparison result exceeds the threshold; if the comparison result does not exceed the threshold, vehicle 106 may notify server 112 of this or decline to transmit an indication of this to server 112.

In some embodiments, prior to performing the update at 336, processing circuitry 266 of server 112 may store multiple values for a particular charger and employ a weighted calculation of a true charging point location. For example, processing circuitry 266 may wait until a threshold number of determinations at 334 are received from one or more vehicles. In some embodiments, the larger the difference between the threshold and the determined location, the less instances of the discrepancy may be required prior to performing the update. For example, if a difference between of the location indicated at column 331 and the location indicated at 324 is computed and compared to a threshold distance, and is determined to be, e.g., 500 meters greater than a threshold difference, relatively few instances of such a large difference may be required prior to performing the update at 336. On the other hand, if a difference between of the location indicated at column 331 and the location indicated at 324 is computed and compared to a threshold distance, and is determined to be, e.g., only 5 meters greater than a threshold difference, processing circuitry 266 may wait for a relatively high number of computations to be received to confirm such minor discrepancy.

In some embodiments, multiple data points may be acquired over the course of a charging session for a particular vehicle, to correlate charging events from the electric charger and vehicle 106, e.g., to correlate authenticity and an update may only be performed if the session between the electric charger and vehicle 106 is verified. For example, a duration of time vehicle 106 is located proximate to charger 111 (e.g., based on detecting an arrival time and a departure time) may be taken into account to confirm the charging event. As another example, processing circuitry 202 and/or processing circuitry 240 and/or processing circuitry of charger 111 may compute a mean or otherwise combined or weighted value based on multiple location measurements made at various times during a charging session. For example, a GPS accuracy may fluctuate during a charging session of, e.g., one hour or one half hour, and multiple measurements and corresponding difference from respective thresholds may be ascertained and combined or averaged to determine an average discrepancy from the stored location at server 112. Such combined or average discrepancy may be transmitted to server 112 for processing, e.g., whether to perform updating based on such computed discrepancy received from a single vehicle or multiple vehicles for a particular charger over time.

In some embodiments, multiple thresholds may be employed. For example, processing circuitry 266 may set a first threshold (e.g., 20 meters or any other suitable threshold) lower than a relatively high second threshold (e.g., 50 meters or any other suitable threshold). If processing circuitry 266 determines that the comparison result determined at 334 exceeds the relatively high second threshold, processing circuitry 266 may determine that there is significant gap between the location of charger 111 stored at server 112 and the location of charger 111 determined at vehicle 106, and may update the location of charger 111 stored at server 112 with the location of charger 111 determined at vehicle 106, e.g., based on the inference that the large gap suggest vehicle 106 is likely correct as compared to the location of charger 111 stored at server 112.

On the other hand, if processing circuitry 266 determines that the comparison result determined at 334 does not exceed the relatively high second threshold but does exceed the first threshold, processing circuitry 266 may perform one or more further steps to determine whether and/or how to update the location of charger 111 stored at server 112. For example, processing circuitry 266 may determine an intermediate location, e.g., a center point, between the location of charger 111 stored at server 112 and the location of charger 111 determined at vehicle 106, and update the location of charger 111 stored at server 112 with the intermediate location. In some embodiments, the intermediate location may be determined based at least in part on compass directions or azimuth angles associated with the respective location coordinates. For example, if the location of charger 111 stored at server 112 is northwest of the location of charger 111 determined at vehicle 106, the intermediate point may be southeast of the location stored at server 112 and northwest of the location determined at vehicle 106.

As another example, if processing circuitry 266 determines that the comparison result determined at 334 does not exceed the relatively high second threshold but does exceed the first threshold, processing circuitry 266 may obtain a current location associated with user device 102 or user device 104. For example, GPS 256 may determine a current location of user device 102 or 104, and transmit the determined location to server 112. In some embodiments, prior to requesting the location processing circuitry 266 and/or processing circuitry 202 may check whether user device 102 or 104 is paired (e.g., via BLE or ultra-wide band or any other suitable connection or combination thereof, such as, for example, for use as a vehicle key) to vehicle 106, and thus is likely to be present in or near vehicle 106. In some embodiments, upon determining the location of user device 102 or 104, processing circuitry 266 may perform any suitable technique (e.g., triangulation), based on the location of user device 102 or 104, the location of charger 111 stored at server 112 and the location of charger 111 determined by vehicle 106, to determine location coordinates with which to update the location of charger 111 stored at server 112.

As another example, if processing circuitry 266 determines that the comparison result determined at 334 does not exceed the relatively high second threshold but does exceed the first threshold, processing circuitry 266 may leverage the ability of charger 111 to perform short-range communication (e.g., the Bluetooth stack or any other suitable technique or any combination thereof) to range vehicle 106. For example, processing circuitry 266 may determine a relative received signal strength indicator (RSSI) or a power level of one or more wireless signals received at vehicle 106 from charger 111, or vice versa. For example, the RSSI may correspond to a strength of an advertising packet received from vehicle 106 (as seen by charger 111) or charger 111 (as seen by vehicle 106), and a greater RSSI value may indicate a stronger signal being received. Based on the RSSI, an estimated distance between vehicle 106 and charger 111 may be determined (e.g., using an equation and/or lookup table that returns distance as a function of RSSI). For example, a more negative dBm value may indicate that vehicle 106 is further away from charger 111, whereas a less negative dBm value may indicate that vehicle 106 is closer to charger 111. In some embodiments, an advertising packet may indicate a transmit power value to user device 238, which may be used in tandem with the RSSI value to range vehicle 106 with respect to charger 111. The distance between vehicle 106 and charger 111 determined based on the short-range communication between vehicle 106 and charger 111 may be used as an additional location input (e.g., for use in a triangulation technique, or any other suitable technique, with the other determined locations of charger 111) in updating the location of charger 111 stored at server 112, e.g., to perform scrubbing and determine an optimal geolocation of charger 111. In some embodiments, in ranging vehicle 106, characteristics for the short-range communication such as, for example, Time of Flight and Angle of Arrival (e.g., in BLE 5 and/or any other suitable BLE version and/or ultra-wide band communications) may be determined, as part of a sensor fusion process along with GPS 226 of vehicle 106.

In some embodiments, a location determined using GPS 256 of user device 102 or user device 104, and/or a location determined based on short-range communication between vehicle 106 and charger 111, may be used instead of the location measured by GPS 226 of vehicle 106. For example, this may occur if the location determined using GPS 256 of user device 102 or user device 104, and/or the location determined based on short-range communication between vehicle 106 and charger 111, is determined as more accurate or reliable than the location measured by GPS 226 of vehicle 106.

The following is an illustrative implementation of determining to update a location of an electric charger stored at a server. Such example indicates an accuracy of about 5 meters for the vehicle GPS, indicates the vehicle is in park, and indicated the latitude and longitude coordinates "37.554512, −122.306814" as determined by the vehicle for the electric charger, which may be compared to a stored location of the electric charger on record.

Figure 4:
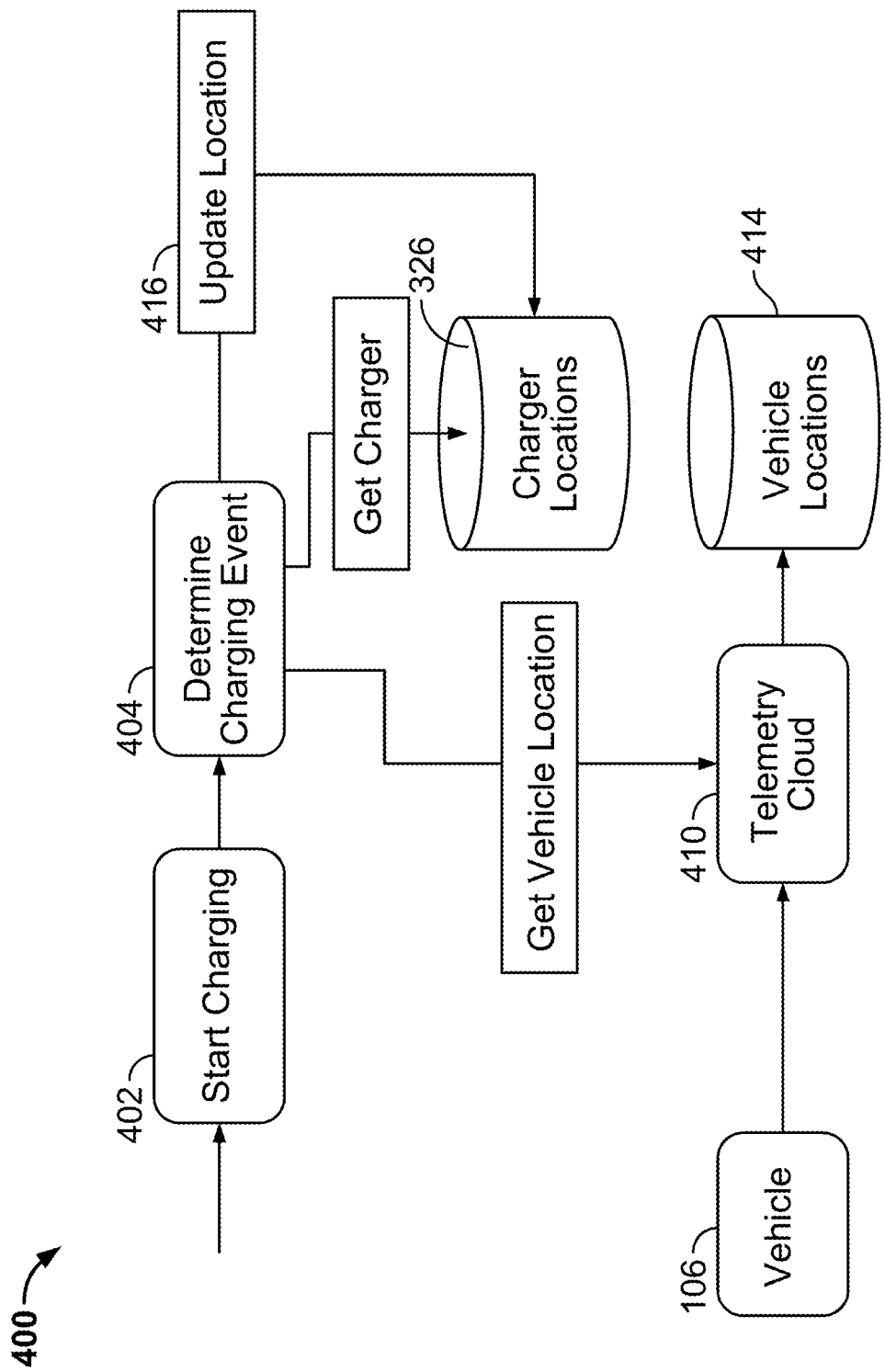
FIG. 4 shows a flowchart of illustrative process for updating a location for an electric charger stored at a server, in accordance with some embodiments of the present disclosure.

Global navigation satellite system [
  Location of charger determined by vehicle GPS:
    "37.554512, −122.306814"
  GPS Accuracy: "5"
],
vehicle status: [
  "park"
],
vehicle charging status
  "currently charging"
], FIG. 4 shows a flowchart of illustrative process 400 for updating a location for an electric charger stored at a server, in accordance with some embodiments of the present disclosure. Process 400 may be executed at least in part by processing circuitry 266 of server 112, and/or processing circuitry of vehicle 106, or at any other suitable computing device and/or using any other suitable circuitry, or any combination thereof.

At 402, vehicle 106, or any other suitable vehicle, may begin charging at charger 111 or any other suitable charger. At 404, a charging event may be determined based on vehicle 106 beginning to be charged at charger 111. For example, the Open Charge Point Protocol (OCPP) or Open Charge Point Interface protocol (OCPI), or any other suitable protocol or technique, or any combination thereof, may facilitate charger 111 to communicate with server 112, e.g., directly or via a back-end system of the charger operator, which may be the same entity that is associated with server 112 or another entity (e.g., ChargePoint, EVgo, etc.). In some embodiments, the Plug & Charge technique, specified by ISO 15118 standard, may be employed, and a certificate exchange may occur to signify a charging event occurrence. In some embodiments, a higher confidence level that a charging session is occurring may be present when server 112 is associated with a same entity as charger 111.

Processing circuitry 266 of server 112 may obtain from locations database 326 or POI database (e.g., maintained by or included in or otherwise associated with server 112) a location of charger 111 associated with the charging event determined at 404. In some embodiments, the location of charger 111, and other locations stored at database 326, may be used by the in-vehicle application or mobile application (e.g., as shown at interface 301) and/or exported to third party services (e.g., Google Maps or any other suitable application, service or website providing location information of electric chargers for electric vehicles).

Processing circuitry 266 of server 112 may obtain telemetry data, including a location of vehicle 106 determined to be charging at charger 111, from vehicle 106, e.g., directly over network 113 or via another server (e.g., telemetry cloud 410) over network 113, as determined by GPS 226 of vehicle 106. In some embodiments, a location of vehicle 106 may be stored at database 414. In some embodiments, Processing circuitry 266 of server 112 may check whether vehicle 106 is in park, e.g., based on an indication received from vehicle 106, to confirm vehicle 106 is associated with a charging session or event. Processing circuitry 266 of server 112 may compare the determined location of vehicle 106 to the location of charger 111 stored at database 326, and may at 416 update the location of charger 111 stored at server 112 based on the comparison. In some embodiments, server 112 may receive information related to compass or azimuth reading from vehicle 106, which may be used in the comparison. In some embodiments, an entity associated with server 112 may enter into agreements to transmit the updated location 416 to other entities (e.g., mapping or navigation services such as Google Maps or any other suitable entity; charger operators such as ChargePoint or any other suitable entity) to enable such entities to update their potentially incorrect location information for electric chargers, to ensure POI geolocation (e.g., latitude/longitude) is correct.

In some embodiments, in updating the location for a particular electric charger and/or electric charging station, server 112 may take in account positioning system data received from a plurality of electric vehicles (e.g., five vehicle, 10 vehicles, 100 vehicles, or any other suitable number of vehicles) determined to be using the electric charger over a period of time (e.g., an hour, a day, a week, or any other suitable period of time). For example, in some circumstances, data from a single vehicle may not be a sufficient basis to update a location of a charger stored at server 112 for an electric charger is incorrect, and should be updated, but rather it may be desirable to determine that data from a certain number of vehicles or charging events over a certain period of time indicates that a location of a charger stored at server 112 is likely incorrect. In some embodiments, location data of multiple and different vehicles determined to be using charger 111 may be aggregated or fused together and considered in combination, and a mean value of the location of such vehicles, or any other suitable value determined based on the multiple determined locations, may be used to update the location of charger 111 stored at server 112.

In some embodiments, processing circuitry 266 may determine, based on the positioning system data received from the multiple vehicles, whether a threshold number of vehicles indicate a discrepancy between the location of the electric charger stored at server 112 and locations indicated by the positioning system data. The threshold may be set to, e.g., 5 vehicles, or any other suitable number, such that if location data of 5 vehicles over the predefined period of time exceeds a threshold difference (e.g., 25 meters or any other suitable threshold) from the location of charger 111 stored at server 112, the location of charger 111 stored at server 112 may be updated. In some embodiments, if a location of charger 111 is determined to be incorrect based on information received from vehicle 106, server 112 may analyze historical data reported by vehicle 106, e.g., whether one or more locations of other chargers were updated based on location information received at least in part from vehicle 106, to determine if a GPS of vehicle 106 is reliable and thus should be trusted to update the location of charger 111.

In some embodiments, one or more machine learning models may be employed to determine whether to update a location of an electric charger stored at server 112. For example, a neural network, or any other suitable machine learning model, may be trained to accept as input stored location data for an electric charger and/or electric charging station, and location data associated with one or more vehicles present at the electric charger and/or electric charging station, and output a determination whether to update the location of the electric charger and/or electric charging station. In some embodiments, the machine learning model may additionally accept as input a location indicated by a user device (e.g., a smartphone or key fob or other suitable user device) associated with an occupant or driver of the vehicle, and/or a distance between the electric vehicle and the electric charger based on short-range wireless communication between the electric vehicle and the electric charger.

Training data may comprise historical pairings of stored location data for electric charge and/or electric charging station and location data associated with vehicles (and/or any other suitable inputs, such as user device information or short-range wireless communication distance information), and an indication of whether the stored location was updated, and/or an indication of the updated location. For example, each training image may be associated with a vector or other numerical representation of any suitable number of dimensions encoding information specifying the input information. In some embodiments, initial weights may be chosen randomly or by pre-training using a deep belief network. Training may be performed in either a supervised learning, wherein the training dataset includes an input paired with a desired output, or where the training dataset includes input having known output and outputs of neural networks are manually graded; partially supervised, or unsupervised manner, wherein the untrained machine learning model attempts to train itself using unlabeled data, using processing resources described herein.

In some embodiments, errors may then be propagated back through the untrained machine learning model. Weights that control the untrained machine learning model may be adjusted, and how well untrained machine learning model is converging towards a model may be monitored, based on known input data. In some embodiments, the untrained machine learning model may be repeatedly trained while adjusting weights to refine an output of the untrained neural network using a loss function and adjustment process, such as stochastic gradient descent. In some embodiments, the untrained machine learning model may be trained until a desired accuracy is achieved. The trained machine learning model can then be deployed to implement any number of machine learning operations.

In some embodiments, the untrained machine learning model may be trained using unsupervised learning, wherein the untrained machine learning model may attempt to train itself using unlabeled data. In some embodiments, an unsupervised learning training dataset may include input data without any associated output data or "ground truth" data, and the untrained machine learning model can learn groupings within the training dataset and can determine how individual inputs are related to the untrained dataset. In some embodiments, unsupervised training can be used to generate a self-organizing map, which is a type of trained machine learning model capable of performing operations useful in reducing dimensionality of new data. Unsupervised training can also be used to perform anomaly detection, which allows identification of data points in a new dataset that deviate from normal or existing patterns of the new dataset. In some embodiments, the semi-supervised learning may be used, which is a technique in which the training dataset includes a mix of labeled and unlabeled data. Incremental learning techniques may be employed, such as through transferred learning techniques. Such incremental learning may enable the trained machine learning model to adapt to new data without forgetting knowledge instilled within the network during initial training.

In some embodiments, the techniques discussed herein for updating a location of an electric charger stored at a server may be used to update any suitable characteristic (e.g., power level, outside temperature, battery pack temperature, occupancy, different battery state of charge levels, or any other suitable characteristic, or any combination thereof) associated with an electric charger. For example, regarding the power level, processing circuitry 266 of server 112 may receive data from vehicle 106 that is being charged by charger 111, indicating how quickly a battery of vehicle 106 is being charged (e.g., a number of kWhs or any other suitable indication) received by vehicle 106. Server 112 may compare the received kWh information to stored information indicating an expected power level of charger 111 stored at server 112 and a location of server 112, to determine whether to update power level information or charging speed information of charger 111 stored at server 112. Server 112 may take into account other factors, e.g., a number of vehicles also being charged at a charging station of charger 111, which may impact how quickly vehicle 106 is bring charged, power levels associated with a plurality of different vehicles using charger 111 over time, ambient temperature or temperature of the battery pack which may impact power levels, or any other suitable factor, or any combination thereof, when updating the power level information for charger 111 stored at server 112. In some embodiments, if the actual power level exceeds the posted, stored power level, the actual power level may be recorded. Such increase may be based on repairs or upgrades that occurred at charger 111, but server 112 may not have taken into account these repairs or upgrades. A similar technique may be employed to verify any other suitable characteristic of the electric charger stored at server 112.

In some embodiments, the techniques discussed herein for updating a location of an electric charger stored at a server may be used to validate and/or update any other suitable parameters, e.g., a minimum charge rate, an average charge rate, a maximum charge rate, price per kWh, a physical space restriction such as, for example, whether a particular space can accommodate a vehicle coupled to a trailer, etc. For example, server 112 may determine, e.g., based on telemetry data, whether a customer has a successful charging session and whether such customer has a trailer and/or a size of such trailer. Such information may be used to indicate to users, e.g., via interface 301, which chargers are associated with a large enough space to accommodate a trailer of a particular size, and/or whether a particular charging station has any spots for chargers that can accommodate a trailer of such a size.

Figure 5:
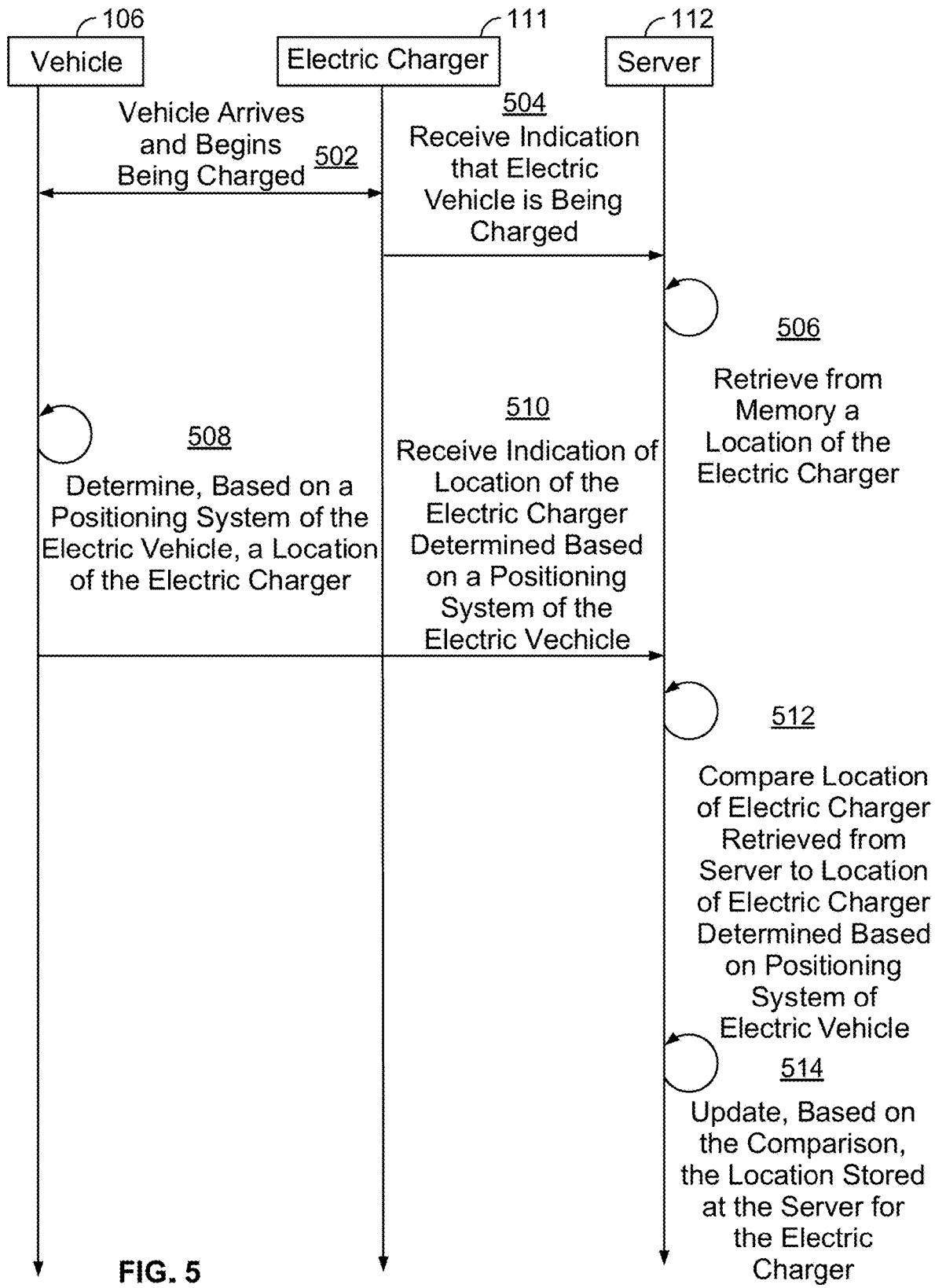
FIG. 5 shows a flowchart of illustrative process for updating a location for an electric charger stored at a server, in accordance with some embodiments of the present disclosure.

FIG. 5 shows a flowchart of illustrative process 500 for updating a location for an electric charger stored at a server, in accordance with some embodiments of the present disclosure. Process 500 may be executed at least in part by processing circuitry 266 of server 112, and/or processing circuitry of vehicle 106, or at any other suitable computing device and/or using any other suitable circuitry, or any combination thereof.

At 502, electric vehicle 106 may arrive at charger 105 and begin being charged. For example, a driver or occupant of vehicle 106 may plug in a plug 110 of charger 111 into a charging port of vehicle 106.

At 504, server 112 may receive an indication that electric vehicle 106 is being charged over network 113. In some embodiments, the Plug & Charge technique, specified by ISO 15118 standard, may be employed, and a certificate exchange may occur to signify a charging event occurrence, e.g., when charger 111 is associated with a same entity as server 112. In some embodiments, the in-vehicle application and/or mobile application may transmit an indication of a start charging event to server 112.

In some embodiments, if charger 111 is associated with a third party (e.g., ChargePoint), such third party may communication the start charging event to server 112, and a certificate exchange may occur between partners, and/or short-range wireless communication techniques may be employed to communicate the start charging event.

At 506, server 112 may retrieve from memory 264 a location of electric charger 111. For example, server 112 may determine that the location for charger 111 stored at memory 264 may be "37.554700, −122.307188," as indicated at column 328.

At 508, processing circuitry 202 of vehicle 106 may determine, based on a positioning system 226 of electric vehicle 106, a location of electric charger 111 (e.g., "37.554512, −122.306814"). In some embodiments, vehicle 106 may check whether vehicle 106 is currently charging, based on data determined by battery system 228, and/or may check that vehicle 106 is in park, and/or perform any other suitable checks or combinations thereof, prior to transmitting the location information to server 112, and/or may transmit such information to server 112 along with the determined location information.

At 510, communications circuitry of 268 of server 112 may receive the indication of the location of the electric charger 111 over network 113 from communications circuitry 258 of vehicle 106, determined based on the positioning system 226 of electric vehicle 106 at 508.

At 512, processing circuitry 266 of server 112 may compare the location of electric charger 111 retrieved from server 112 (e.g., "37.554700, −122.307188" in column 331) to the location of electric charger 111 determined based on positioning system 226 of electric vehicle 106 (e.g., "37.554512, −122.306814"). For example, processing circuitry 266 may determine, based on the comparison, that a difference between the two locations is 39.04 meters.

At 514, processing circuitry 266 of server 112 may update, based on the comparison, the location stored at the server for electric charger 111. In some embodiments, processing circuitry 266 of server 112 may compare the determined difference between the location's (e.g., 39.04 meters, or any other suitable determined distance) to a threshold (e.g., 25 meters, or any other suitable threshold), and perform the updating based on the determined difference exceeding the threshold. In some embodiments, machine learning techniques may be employed, to output a determination as to whether the stored location of charger 111 should be updated. In some embodiments, processing circuitry 266 may wait, prior to performing the updating, for a threshold number of vehicles or a threshold number of instances in which a similar discrepancy is reported. In some embodiments, the amount by which the comparison results exceed the threshold may inform how many vehicles or instances processing circuitry 266 should wait to confirm the discrepancy. For example, if the threshold is exceeded by a minimal amount, additional data points confirming the minimal discrepancy may be required prior to the updating. On the other hand, if the threshold is exceeded by a significant amount, no additional data points confirming the significant discrepancy, or only a few additional data points confirming the significant discrepancy, may be required prior to performing the updating.

In some embodiments, each electric charger may be associated with a location object which dictates a location of an icon representing the electric charger in a mapping or GPS application, e.g., for display at interface 301. In some embodiments, the location object may be automatically or manually (e.g., by an administrator via a web portal) updated based on the updating at 514, so in the future other users may more easily and efficiently locate and navigate to the charger.

In some embodiments, server 112 may notify third parties (e.g., Google Maps or ChargePoint, or any other suitable party) that the stored location for charger 111 is incorrect. For example, the third party may base its stored location for charger 111 on information from server 112, which may be wrongly geotagged, and may update a location of a user interface object for charger 111 based on the updated location for charger 111 received from server 112. In some embodiments, the third party may utilize a plug-in, to receive automatic location updates from server 112 for electric chargers and/or electric charging stations.

Figure 6:
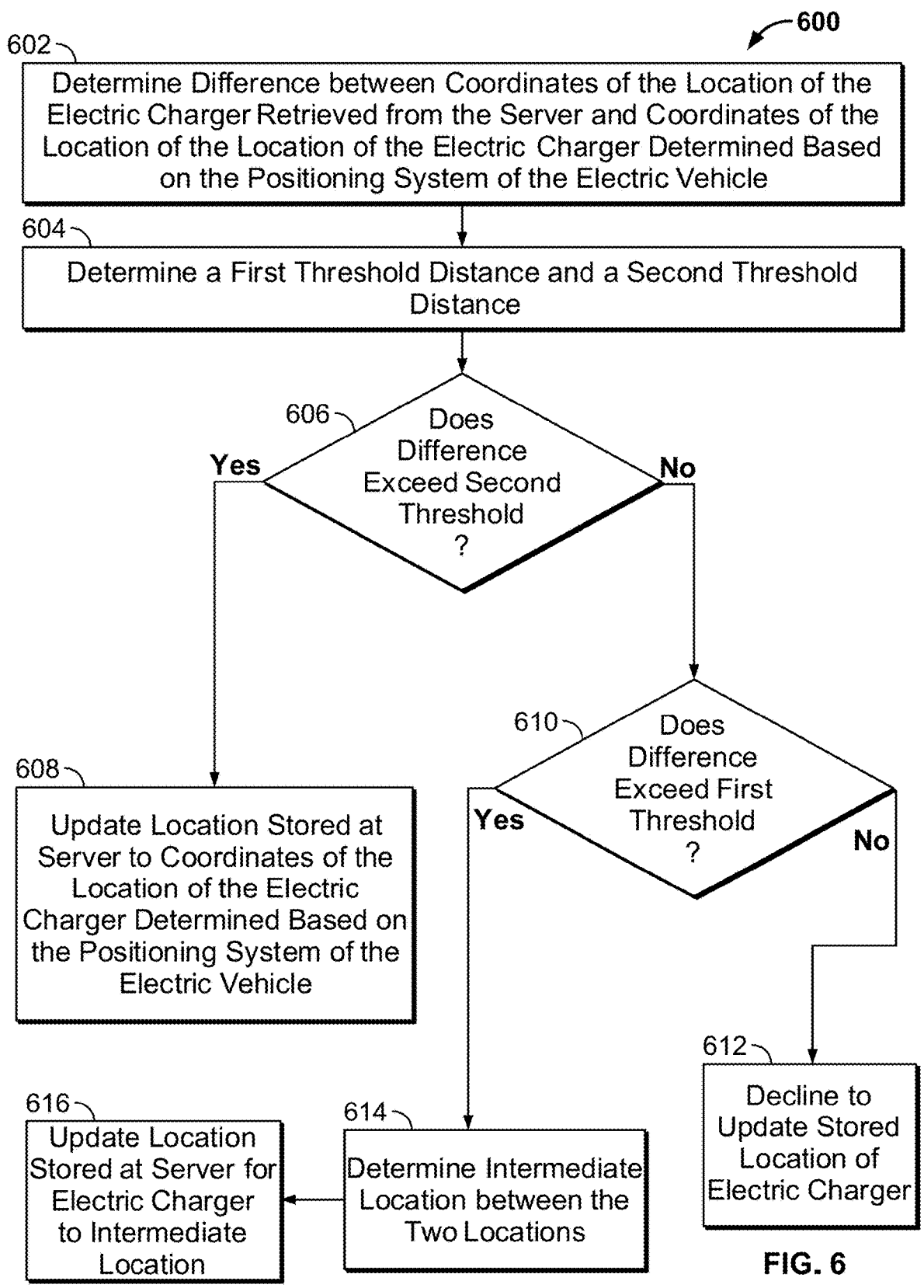
FIG. 6 shows a flowchart of illustrative process for updating a location for an electric charger stored at a server, in accordance with some embodiments of the present disclosure.

FIG. 6 shows a flowchart of illustrative process 600 for updating a location for an electric charger stored at a server, in accordance with some embodiments of the present disclosure. Process 600 may be executed at least in part by processing circuitry 266 of server 112, and/or processing circuitry of vehicle 106, or at any other suitable computing device and/or using any other suitable circuitry, or any combination thereof.

At 602, processing circuitry 266 of server 112 may determine a difference between a location of electric charger 111 stored at server 112 to a location determined by vehicle 106. For example, processing circuitry 266 may determine that a difference between the two locations is 39.04 meters.

At 604, processing circuitry 266 may determine a first threshold distance and a second threshold distance. The second threshold may be selected such that if the difference determined at 602 exceeds the second threshold, processing circuitry 266 may cause the location for charger 111 stored at server 112 to be updated. For example, the second threshold may be determined to be a relatively large distance that suggests the location for charger 111 stored at server 112 is likely inaccurate (e.g., 50 meters or any other suitable distance). The first threshold may be selected (e.g., less than the second threshold) such that if the difference determined at 602 exceeds the second threshold, there is some likelihood that the location for charger 111 stored at server 112 is inaccurate, but additional processing steps may be performed as additional verification steps. In some embodiments, determining one or more of the thresholds may take into account a length of a charging cable of charger 111, and/or a location of a charging port on vehicle 106, and/or whether a wireless charging technique (e.g., via mutual inductive plates) is being employed, and/or any other suitable factor or any combination thereof.

At 606, processing circuitry 266 may determine whether the difference determined at 602 exceeds the second threshold. For example, if the determined difference is 39.04 meters and the second threshold is 50 meters, processing circuitry 266 may determine the determined difference does not exceed the second threshold, and processing may proceed to 610. On the other hand, may determine that the difference determined at 602 exceeds the second threshold, e.g., if the determined difference is 60 meters and the second threshold is 50 meters, processing may proceed to 608, where the location for charger 111 stored at server 112 may be updated to match the location determined by the positioning system of vehicle 106, such as discussed in connection with 514 of FIG. 5.

At 610, processing circuitry 266 may determine whether the difference determined at 602 exceeds the first threshold. For example, if the determined difference is 39.04 meters and the first threshold is 25 meters, processing circuitry 266 may determine the determined difference does exceed the first threshold, and processing may proceed to 614. Otherwise, processing may proceed to 612, where processing circuitry 266 may decline to update a location of charger 111 stored at server 112, based at least in part on the distance determined at 602 failing to exceed either the first or second thresholds.

At 614, processing circuitry 266 may determine an intermediate location between the two locations. For example, processing circuitry 266 may determine a center point, between the location of charger 111 stored at server 112 and the location of charger 111 determined at vehicle 106, and update the location of charger 111 stored at server 112 with the intermediate location. In some embodiments, the intermediate location may be determined based at least in part on compass directions or azimuth angles associated with the respective location coordinates.

At 616, processing circuitry 266 may update the location stored at server 112 for electric charger to the intermediate location determined at 614. In some embodiments, such update may be communicated to third parties, e.g., as discussed at 514 of FIG. 5.

Figure 7:
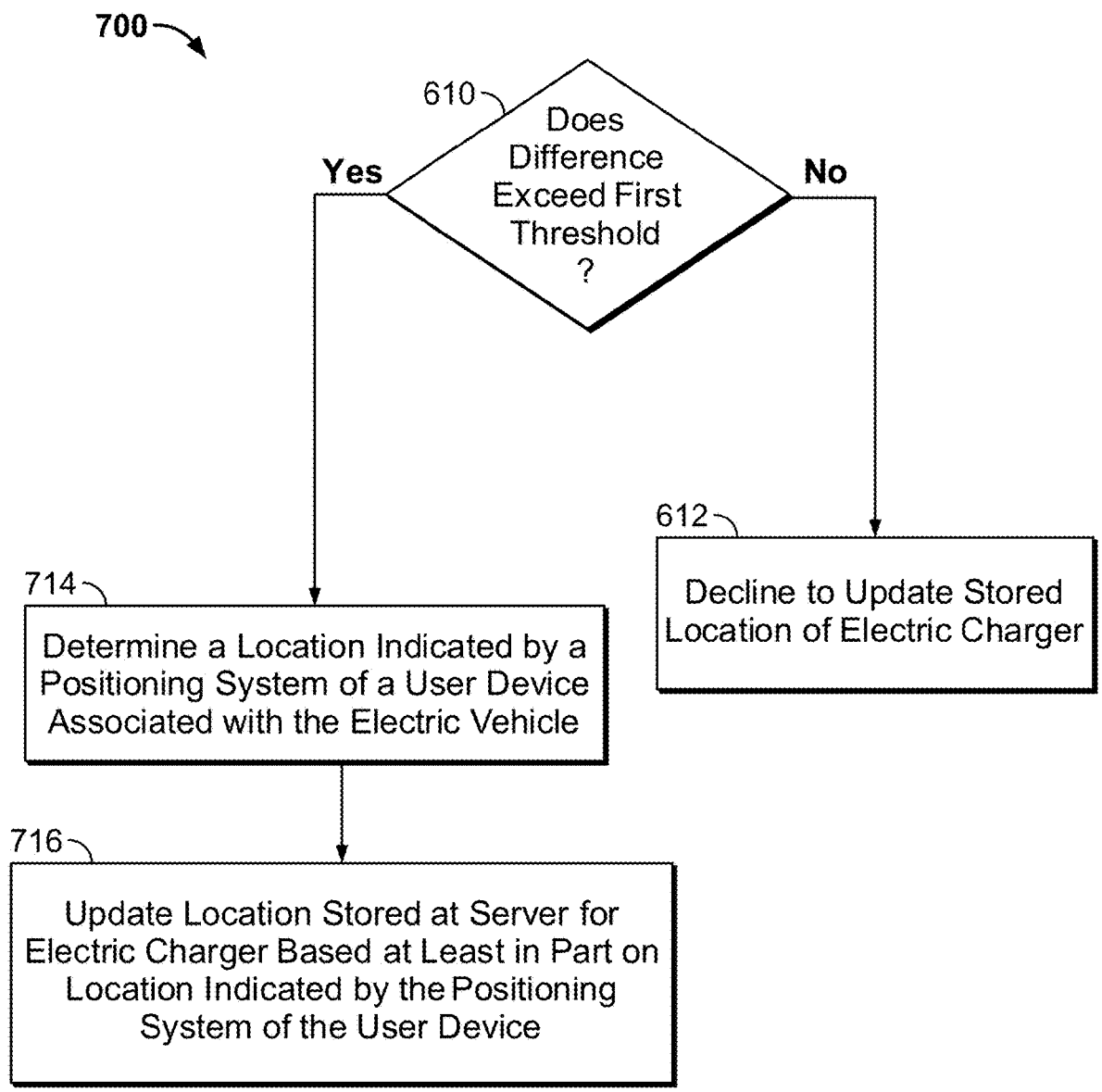
FIG. 7 shows a flowchart of illustrative process for updating a location for an electric charger stored at a server, in accordance with some embodiments of the present disclosure.

FIG. 7 shows a flowchart of illustrative process 700 for updating a location for an electric charger stored at a server, in accordance with some embodiments of the present disclosure. Process 700 may be executed at least in part by processing circuitry 266 of server 112, and/or processing circuitry of vehicle 106, or at any other suitable computing device and/or using any other suitable circuitry, or any combination thereof.

As shown in FIG. 7, if processing circuitry 266 determines at 610 (as discussed in FIG. 6) that the distance determined at 602 exceeds the first threshold (e.g., 25 meters, or any other suitable threshold distance), processing may proceed to 714; otherwise processing circuitry 266 may decline to update the stored location of charger 111.

At 714, processing circuitry 266 may determine a location indicated by a positioning system 256 of a user device 102 or 104 associated with electric vehicle 106. For example, a current location of a user device 102 or 104 may be determined, where such user device may be determined to be paired or in communication with vehicle 106 having been determined to be associated with a current charging session, and transmitted to processing circuitry 266.

At 716, processing circuitry 266 may update the location stored at server 112 for charger 111 based at least in part on the location indicated by positioning system 256 of user device 102 or 104. Processing circuitry 266 may perform any suitable technique (e.g., triangulation), based on the location of user device 102 or 104, the location of charger 111 stored at server 112 and the location of charger 111 determined by vehicle 106, to determine location coordinates with which to update the location of charger 111 stored at server 112, and perform the updating.

Figure 8:
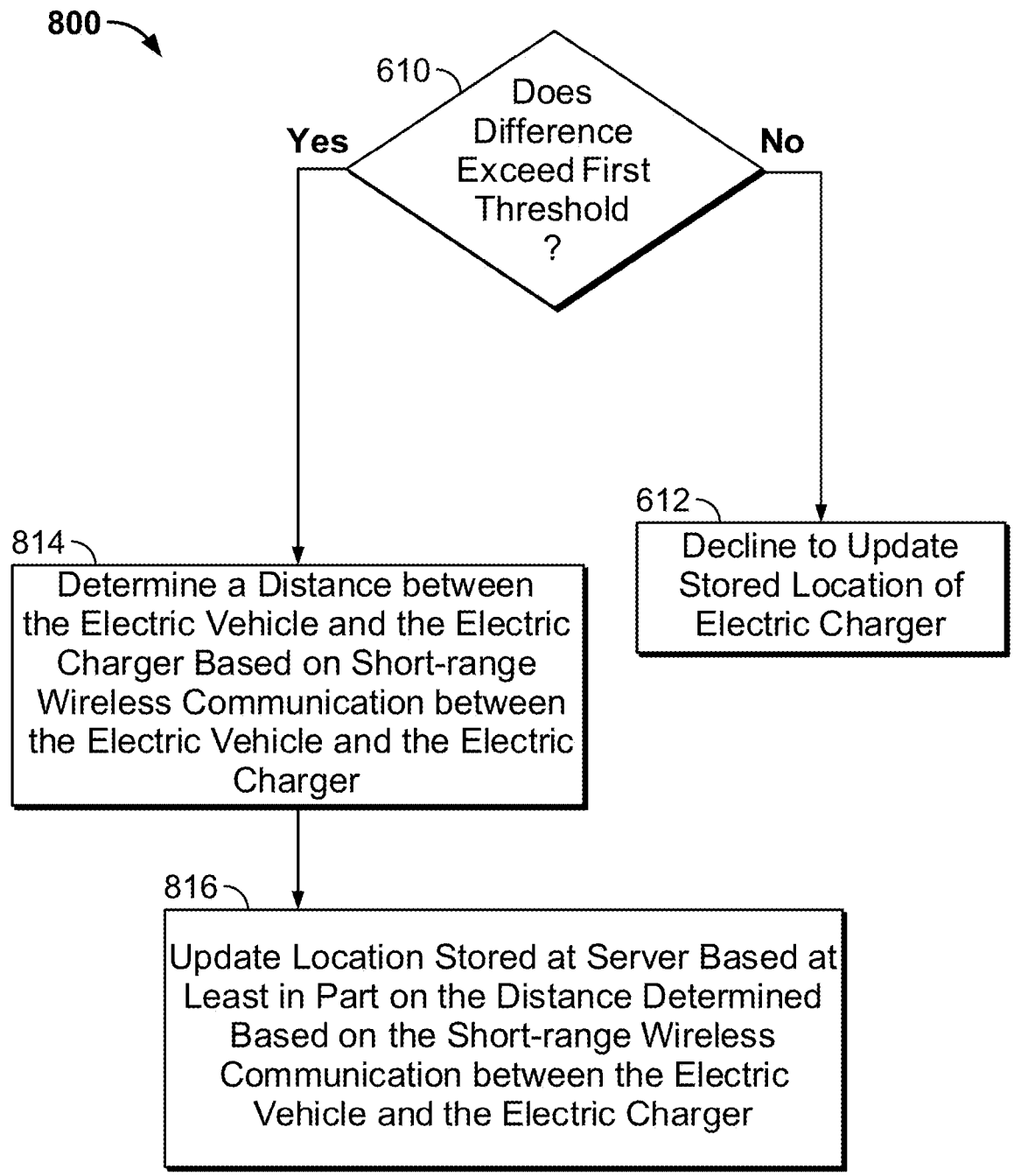
FIG. 8 shows a flowchart of illustrative process for updating a location for an electric charger stored at a server, in accordance with some embodiments of the present disclosure.

FIG. 8 shows a flowchart of illustrative process 800 for updating a location for an electric charger stored at a server, in accordance with some embodiments of the present disclosure. Process 800 may be executed at least in part by processing circuitry 266 of server 112, and/or processing circuitry of vehicle 106, or at any other suitable computing device and/or using any other suitable circuitry, or any combination thereof.

As shown in FIG. 8, if processing circuitry 266 determines at 610 (as discussed in FIG. 6) that the distance determined at 602 exceeds the first threshold (e.g., 25 meters, or any other suitable threshold distance), processing may proceed to 814; otherwise processing circuitry 266 may decline to update the stored location of charger 111.

At 814, processing circuitry 266 may determine a distance between the electric vehicle and the electric charger based at least in part on short-range wireless communication between the electric vehicle and the electric charger. For example, processing circuitry 266 may leverage the ability of charger 111 to perform short-range communication (e.g., the Bluetooth stack or any other suitable technique or any combination thereof) to range vehicle 106 with respect to charger 111. In some embodiments, user device 102 or vehicle 106 may provide or be requested to provide an image, e.g., taken from vehicle 106, of charger 111, which may be transmitted to server 112, and which may be processed and analyzed to help ascertain a location between vehicle 106 and charger 111.

At 816, processing circuitry 266 may update the location stored at server 112 based at least in part on the distance determined based on the short-range wireless communication between electric vehicle 106 and electric charger 111. In some embodiments, an indication of the distance may be additionally or alternatively verified based on a captured image transmitted to server 112 comprising at least a portion of one or more of vehicle 106 and charger 111. Such distance determined based on the short-range wireless communication and/or the captured image may be used, along with the location of charger 111 stored at server 112 and the location of charger 111 determined by vehicle 106, to determine location coordinates with which to update the location of charger 111 stored at server 112, and perform the updating.

Figure 9:
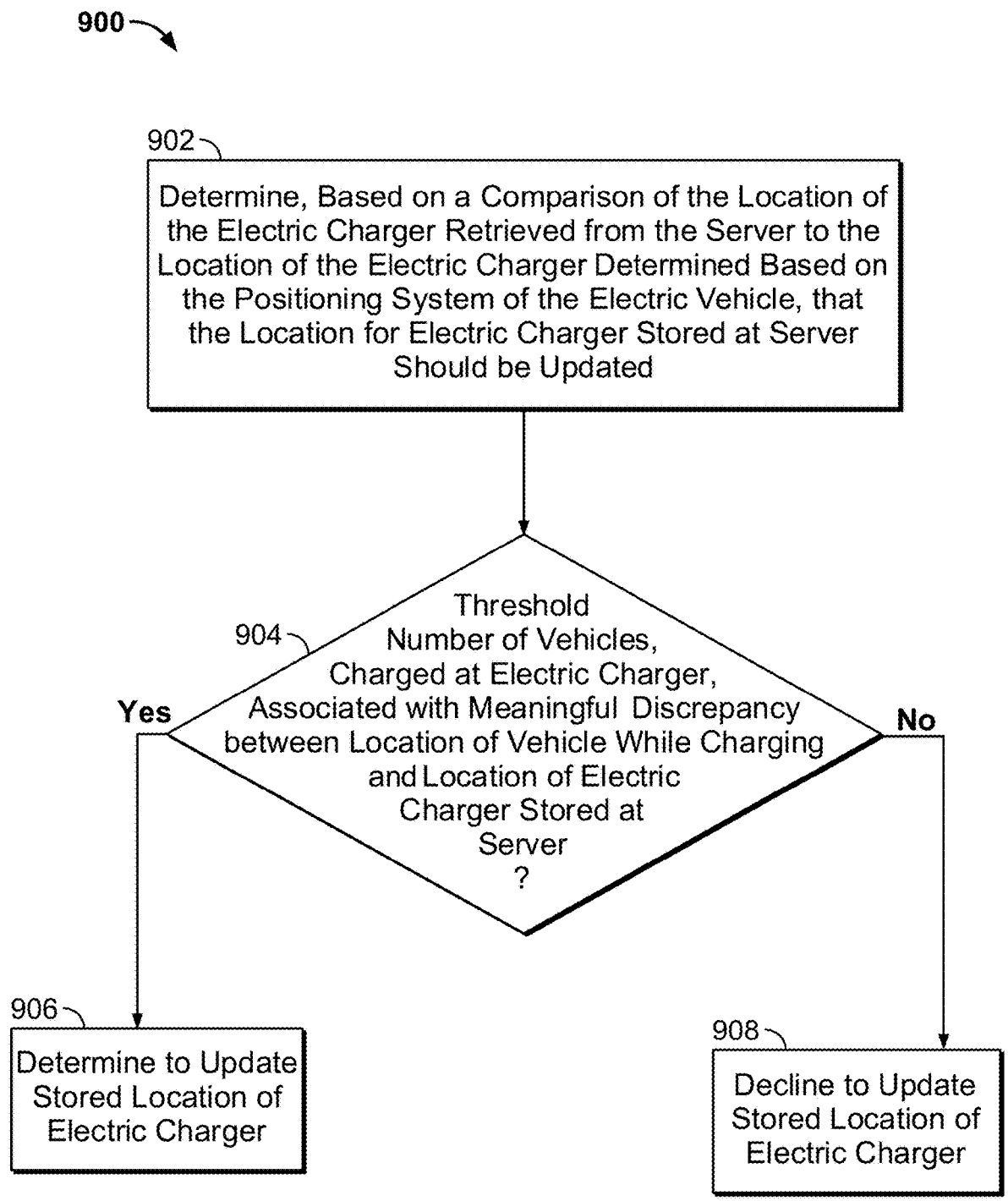
FIG. 9 shows a flowchart of illustrative process for updating a location for an electric charger stored at a server, in accordance with some embodiments of the present disclosure.

FIG. 9 shows a flowchart of illustrative process 900 for updating a location for an electric charger stored at a server, in accordance with some embodiments of the present disclosure. Process 900 may be executed at least in part by processing circuitry 266 of server 112, and/or processing circuitry of vehicle 106, or at any other suitable computing device and/or using any other suitable circuitry, or any combination thereof.

At 902, processing circuitry 266 of server 112 may determine, based on a comparison of the location of electric charger 111 retrieved from server 112 to the location of electric charger 111 determined based on positioning system 226 of electric vehicle 106, that the location for electric charger 111 stored at server 112 should be updated. For example, any technique discussed in FIGS. 1-8, or any combination thereof, may be used to make this determination.

At 904, processing circuitry 266 may determine whether a threshold number of vehicles, charged at electric charger 111, are associated with a meaningful discrepancy between a determined location of vehicle 106 while charging and a location of electric charger 111 stored at server 112. For example, processing circuitry 266 may receive from multiple electric vehicles, respective locations (e.g., as determined by GPS 226 of each vehicle) of each respective vehicle while charging at charger 111 over a predefined period of time (e.g. one week, or any other suitable period of time). Such respective locations may be compared to the stored location of charger 111, and/or other data from other techniques (e.g., as described in FIGS. 7-8) may be used, to determine whether the location of charger 111 should be updated based on data associated with a single vehicle. An aggregation of these determinations may be computed and compared to a threshold (e.g., 10 vehicles, or any other suitable threshold). For example, if processing circuitry 266, over a week, determines that data received from 11 vehicles (exceeding the threshold of 10) indicates an update should be performed, processing may proceed to 906; otherwise processing may proceed to 908.

In some embodiments, machine learning techniques may be employed, in performing step 904. For example, a machine learning model (e.g., a neural network or any other suitable machine learning model) may be trained using historical data, to determine a suitable threshold number of vehicles for use at 904, and/or to determine whether the location of charger 111 stored at server 112 should be updated. For example, the machine learning model may be trained to recognize patterns in the training data that are indicative of whether a particular stored location of a charger should be updated.

At 906, processing circuitry 266 may determine to update a stored location of electric charger 111, based on the determination at 904 (e.g if data from a threshold number of vehicles over a period of time indicate an update should be performed).

At 908, processing circuitry 266 may decline to update the stored location of electric charger 111 based on the determination at 904 (e.g., if data from a threshold number of vehicles over a period of time indicate an update need not be performed).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
   determining that an electric vehicle is being charged at an electric charger;
   retrieving, from a server storing a plurality of locations of electric chargers, a location of the electric charger;
   determining, based on a positioning system of the electric vehicle, a location of the electric charger;
   comparing the location of the electric charger retrieved from the server to the location of the electric charger determined based on the positioning system of the electric vehicle;
   determining, based on the comparison, a distance between the location of the electric charger retrieved from the server and the location of the electric charger determined based on the positioning system of the electric vehicle;
   determining whether the distance exceeds a non-zero threshold distance value;
   in response to determining that the distance is below the non-zero threshold distance value, declining to update the location stored at the server for the electric charger; and
   in response to determining that the distance exceeds the non-zero threshold distance value, updating the location stored at the server for the electric charger.

2. The method of claim 1, wherein updating the location stored at the server for the electric charger comprises:
   updating the location stored at the server for the electric charger to be the location of the electric charger determined based on the positioning system of the electric vehicle.

3. The method of claim 1, wherein updating the location stored at the server for the electric charger comprises:
   determining an intermediate location that is in between the location of the electric charger retrieved from the server and the location of the electric charger determined based on the positioning system of the electric vehicle; and
   updating the location stored at the server for the electric charger to be the intermediate location.

4. The method of claim 1, further comprising:
   receiving positioning system data from a plurality of electric vehicles determined to be using the electric charger over a period of time;
   determining, based on the positioning system data, whether there is a discrepancy between the location of the electric charger stored at the server and locations indicated by the positioning system data; and
   updating the location stored at the server for the electric charger further in response to determining that the positioning system data indicates that a threshold number of electric vehicles are associated with the discrepancy over the period of time.

5. The method of claim 1, wherein updating the location stored at the server for the electric charger further comprises:
   determining a location indicated by a positioning system of a user device associated with the electric vehicle;
   comparing the location indicated by the positioning system of the user device to at least one of the location of the electric charger retrieved from the server and the location of the electric charger determined based on the positioning system of the electric vehicle; and
   updating the location stored at the server for the electric charger further based on the comparing of the location indicated by the positioning system of the user device to at least one of the location of the electric charger retrieved from the server and the location of the electric charger determined based on the positioning system of the electric vehicle.

6. The method of claim 1, wherein the distance is a first distance, and updating the location stored at the server for the electric charger comprises:
   determining a second distance between the electric vehicle and the electric charger based on short-range communication between the electric vehicle and the electric charger; and
   updating the location stored at the server for the electric charger further based on the second distance.

7. The method of claim 1, wherein determining that the electric vehicle is being charged at the electric charger comprises:
   receiving an indication that the electric vehicle is in park; and
   receiving an indication that a new charging session has started.

8. The method of claim 1, further comprising:
   determining a length of an electric charging cable of the electric charger; and
   determining whether to update the location stored at the server for the electric charger based at least in part on the determined length of the electric charging cable.

9. A system comprising:
   a server;
   processing circuitry configured to:
      determine that an electric vehicle is being charged at an electric charger;
      retrieve, from the server storing a plurality of locations of electric chargers, a location of the electric charger;
      determine, based on a positioning system of the electric vehicle, a location of the electric charger;
      compare the location of the electric charger retrieved from the server to the location of the electric charger determined based on the positioning system of the electric vehicle;
      determine, based on the comparison, a distance between the location of the electric charger retrieved from the server and the location of the electric charger determined based on the positioning system of the electric vehicle
      determine whether the distance exceeds a non-zero threshold distance value;
      in response to determining that the distance is below the non-zero threshold distance value, decline to update the location stored at the server for the electric charger; and
      in response to determining that the distance exceeds the non-zero threshold distance value, update the location stored at the server for the electric charger.

10. The system of claim 9, wherein the processing circuitry is configured to update the location stored at the server for the electric charger by:
    updating the location stored at the server for the electric charger to be the location of the electric charger determined based on the positioning system of the electric vehicle.

11. The system of claim 9, wherein the processing circuitry is configured to update
    determining an intermediate location that is in between the location of the electric charger retrieved from the server and the location of the electric charger determined based on the positioning system of the electric vehicle; and
    updating the location stored at the server for the electric charger to be the intermediate location.

12. The system of claim 9, wherein the processing circuitry is further configured to:
    receive positioning system data from a plurality of electric vehicles determined to be using the electric charger over a period of time;
    determine, based on the positioning system data, whether there is a discrepancy between the location of the electric charger stored at the server and locations indicated by the positioning system data; and
    update the location stored at the server for the electric charger further in response to determining that the positioning system data indicates that a threshold number of electric vehicles are associated with the discrepancy over the period of time.

13. The system of claim 9, wherein the processing circuitry is further configured to update the location stored at the server for the electric charger by:
    determining a location indicated by a positioning system of a user device associated with the electric vehicle;
    comparing the location indicated by the positioning system of the user device to at least one of the location of the electric charger retrieved from the server and the location of the electric charger determined based on the positioning system of the electric vehicle; and
    updating the location stored at the server for the electric charger further based on the comparing of the location indicated by the positioning system of the user device to at least one of the location of the electric charger retrieved from the server and the location of the electric charger determined based on the positioning system of the electric vehicle.

14. The system of claim 9, wherein the distance is a first distance, and the processing circuitry is configured to update the location stored at the server for the electric charger by:
    determining a second distance between the electric vehicle and the electric charger based on short-range communication between the electric vehicle and the electric charger; and
    updating the location stored at the server for the electric charger further based on the second distance.

15. The system of claim 9, wherein the processing circuitry is configured to determine that the electric vehicle is being charged at the electric charger by:
    receiving an indication that the electric vehicle is in park; and
    receiving an indication that a new charging session has started.

16. The system of claim 9, wherein the processing circuitry is further configured to:
- determine a length of an electric charging cable of the electric charger; and
- determine whether to update the location stored at the server for the electric charger based at least in part on the determined length of the electric charging cable.

17. A non-transitory computer-readable medium having non-transitory computer-readable instructions encoded thereon that, when executed by a processor, causes the processing circuitry to:
- determine that an electric vehicle is being charged at an electric charger;
- retrieve, from a server storing a plurality of locations of electric chargers, a location of the electric charger;
- determine, based on a positioning system of the electric vehicle, a location of the electric charger;
- compare the location of the electric charger retrieved from the server to the location of the electric charger determined based on the positioning system of the electric vehicle;
- determine, based on the comparison, a distance between the location of the electric charger retrieved from the server and the location of the electric charger determined based on the positioning system of the electric vehicle;
- determine whether the distance exceeds a non-zero threshold distance value;
- in response to determining that the distance is below the non-zero threshold distance value, decline to update the location stored at the server for the electric charger; and
- in response to determining that the distance exceeds the non-zero threshold distance value, update the location stored at the server for the electric charger.

18. The non-transitory computer-readable medium of claim 17, wherein the execution of the instructions to update the location stored at the server for the electric charger, causes the processing circuitry to:
- update the location stored at the server for the electric charger to be the location of the electric charger determined based on the positioning system of the electric vehicle.

19. The non-transitory computer-readable medium of claim 17, wherein the execution of the instructions to update the location stored at the server for the electric charger, further causes the processing circuitry to:
- determine an intermediate location that is in between the location of the electric charger retrieved from the server and the location of the electric charger determined based on the positioning system of the electric vehicle; and
- update the location stored at the server for the electric charger to be the intermediate location.

20. The non-transitory computer-readable medium of claim 17, wherein the execution of the instructions further causes the processing circuitry to:
- receive positioning system data from a plurality of electric vehicles determined to be using the electric charger over a period of time;
- determine, based on positioning system data, whether there is a discrepancy between the location of the electric charger stored at the server and locations indicated by the positioning system data; and
- update the location stored at the server for the electric charger further in response to determining that the positioning system data indicates that a threshold number of electric vehicles are associated with the discrepancy over the period of time.

* * * * *